United States Patent
Yoshioka et al.

(10) Patent No.: US 9,945,328 B2
(45) Date of Patent: Apr. 17, 2018

(54) LOW-PRESSURE-LOOP EXHAUST RECIRCULATION APPARATUS OF ENGINE

(71) Applicant: AISAN KOGYO KABUSHIKI KAISHA, Obu-shi, Aichi (JP)

(72) Inventors: Mamoru Yoshioka, Nagoya (JP); Takehide Nakamura, Handa (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 408 days.

(21) Appl. No.: 14/471,493

(22) Filed: Aug. 28, 2014

(65) Prior Publication Data

US 2015/0082790 A1      Mar. 26, 2015

(30) Foreign Application Priority Data

Sep. 20, 2013  (JP) ................................ 2013-195652
Jan. 30, 2014  (JP) ................................ 2014-015967

(51) Int. Cl.
*F02M 26/06*      (2016.01)
*F02M 26/10*      (2016.01)
(Continued)

(52) U.S. Cl.
CPC ....... *F02M 25/0709* (2013.01); *F02B 37/127* (2013.01); *F02B 37/16* (2013.01);
(Continued)

(58) Field of Classification Search
CPC .. F02M 26/06; F02M 26/10; F02M 35/10281; F02B 2037/162
See application file for complete search history.

(56) References Cited

U.S. PATENT DOCUMENTS 5,897,096 A * 4/1999 Nakano ................. F02M 3/075
                                               251/129.15
9,285,054 B2 * 3/2016 Matsumoto ........... F16K 31/408
(Continued)

FOREIGN PATENT DOCUMENTS

DE        10020041 A1 * 10/2001  .............. F02B 37/16
EP         1031722 A2 *  8/2000  ................ F02B 1/12
(Continued)

OTHER PUBLICATIONS

DE 10020041 A1 English Translation.*
(Continued)

*Primary Examiner* — Phutthiwat Wongwian
*Assistant Examiner* — Jessica Kebea
(74) *Attorney, Agent, or Firm* — Oliff PLC

(57) ABSTRACT

A low-pressure-loop EGR apparatus of an engine includes an EGR passage to allow part of exhaust gas discharged from a combustion chamber to return as EGR gas to the combustion chamber, and an EGR valve to regulate a flow of EGR gas in the EGR passage. This passage has an inlet connected to an exhaust passage downstream of a turbine and an outlet connected to an intake passage upstream of a compressor. In the intake passage, an intake bypass passage is provided to connect an upstream portion and a downstream part from the compressor. An ABV is provided in the passage. To remove EGR gas remaining in the ABV, one end of a residual gas removal passage is connected to the intake passage downstream of a throttle valve and the other end of the same passage is connected to the ABV.

2 Claims, 21 Drawing Sheets

(51) Int. Cl.
*F02M 26/23* (2016.01)
*F02B 37/16* (2006.01)
*F02B 37/18* (2006.01)
*F02B 37/12* (2006.01)
*F02B 29/04* (2006.01)
*F02M 13/00* (2006.01)
*F02M 35/10* (2006.01)
*F02M 25/07* (2006.01)
*F01M 13/00* (2006.01)
*F02D 9/08* (2006.01)

(52) U.S. Cl.
CPC ............ *F02B 37/18* (2013.01); *F02M 26/06* (2016.02); *F02M 35/10209* (2013.01); *F02M 35/10281* (2013.01); *F01M 13/00* (2013.01); *F02B 29/0406* (2013.01); *F02D 9/08* (2013.01); *F02M 26/10* (2016.02); *F02M 26/23* (2016.02); *F02M 35/10386* (2013.01); *Y02T 10/121* (2013.01); *Y02T 10/144* (2013.01)

(56) References Cited

U.S. PATENT DOCUMENTS

| | | | |
|---|---|---|---|
| 2007/0051105 A1* | 3/2007 | Thiery | F02B 29/0418 60/600 |
| 2009/0308364 A1 | 12/2009 | Konohara | |
| 2011/0162360 A1 | 7/2011 | Vaught et al. | |
| 2011/0209691 A1 | 9/2011 | Kuroki et al. | |
| 2012/0247438 A1 | 10/2012 | Konohara | |
| 2013/0213369 A1 | 8/2013 | Doko et al. | |

FOREIGN PATENT DOCUMENTS

| | | | | |
|---|---|---|---|---|
| JP | 2003-191746 A | 7/2003 | | |
| JP | 2007-198310 A | 8/2007 | | |
| JP | A-2009-299645 | 12/2009 | | |
| JP | 2011-112012 A | 6/2011 | | |
| JP | A-2012-215155 | 11/2012 | | |
| JP | A-2012-229679 | 11/2012 | | |
| JP | A-2012-237231 | 12/2012 | | |
| JP | A-2013-83339 | 5/2013 | | |
| JP | A-2013-170456 | 9/2013 | | |
| WO | WO 2006133986 A2 * | 12/2006 | ............ | F02B 37/16 |
| WO | WO 2009046292 A2 * | 4/2009 | ............ | F02B 33/32 |
| WO | 2010/103629 A1 | 9/2010 | | |
| WO | WO 2011157521 A1 * | 12/2011 | ............ | F02B 37/16 |
| WO | WO 2016162968 A1 * | 10/2016 | ............ | F16K 1/00 |

OTHER PUBLICATIONS

Jul. 22, 2016 Office Action issued in Chinese Patent Application No. 201410484087.4.

Mar. 7, 2017 Office Action issued in Japanese Patent Application No. 2014-015967.

* cited by examiner

LOW-PRESSURE-LOOP EXHAUST RECIRCULATION APPARATUS OF ENGINE

CROSS-REFERENCE TO RELATED APPLICATIONS

This application is based upon and claims the benefit of priority from the prior Japanese Patent Applications No. 2013-195652 filed on Sep. 20, 2013, and No. 2014-015967 filed on Jan. 30, 2014, the entire contents of which are incorporated herein by reference.

BACKGROUND OF THE INVENTION

Field of the Invention

The present invention relates to a low-pressure-loop exhaust gas recirculation apparatus of an engine, provided in a supercharger-equipped engine and configured to allow part of exhaust gas discharged from the engine to an exhaust passage to flow as exhaust recirculation gas into an intake passage to return to the engine.

Related Art

There is conventionally known that an engine equipped with a supercharger is provided with an exhaust gas recirculation (EGR) apparatus. JP-A-2012-229679 discloses an engine provided with a supercharger of the above type and a low-pressure-loop EGR apparatus provided in the engine. This supercharger includes a turbine provided in an exhaust passage and a compressor provided in an intake passage and driven by the turbine. This EGR apparatus is provided with an EGR passage between the exhaust passage downstream of the turbine and the intake passage upstream of the compressor, and an EGR valve in the EGR passage. This EGR apparatus is configured to respond to a strict demand for reduction of NOx and to restrict a returning amount of EGR gas by closing the EGR valve as needed in order to prevent corrosion due to condensed water generated in the EGR passage.

Herein, when a pressure difference between an inlet and an outlet of the compressor excessively increases, an air flow becomes unstable due to blade surfaces of the compressor, leading to surging which may cause self-excited vibration of the air flow. To prevent such surging, therefore, an intake bypass passage is provided to bypass between the upstream part of the intake passage from the compressor and the downstream part of the intake passage from the compressor and an intake bypass valve is provided in this bypass passage so as to open as needed. This can reduce the pressure difference between the inlet and the outlet of the compressor, thereby enabling preventing the occurrence of surging. A supercharger-equipped engine including the above intake bypass passage and intake bypass valve may also be provided with a low-pressure-loop EGR apparatus.

One example of the intake bypass valve of the above type is disclosed in JP-A-2013-83339. This intake bypass valve includes a movable unit having a valve member to open and close a valve seat provided between an in-flow passage and an out-flow passage of the intake bypass passage, on an out-flow passage side, and an elastic member to bias the movable unit in a closing direction, an electromagnetic device to move the movable unit in an opening direction by electromagnetic force against the biasing force of the elastic member, a pressure responsive member provided between a fixed-side member of the electromagnetic device and the movable unit to define a pressure balance chamber partitioned from the out-flow passage, and a pressure introduction passage formed in the movable unit to provide communication between the in-flow passage and the pressure balance chamber. In this intake bypass valve, in a valve closed state where the valve member seats on the valve seat, the air pressure applied to the in-flow passage side of the valve member and the air pressure applied to the pressure balance chamber side are balanced. In the pressure introduction passage, a dynamic pressure reducing member is provided to reduce dynamic pressure of air acting on the pressure balance chamber. With the above configuration, the dynamic pressure reducing member provided in the pressure introduction passage reduces the dynamic pressure of air acting on the pressure balance chamber at the time of start of valve opening. This can shorten a valve opening time and enhance valve opening response.

On the other hand, as a technique provided in a supercharger-equipped engine, a blowby gas recirculation apparatus to return blowby gas generated in the engine to the engine via an intake passage. The above type technique is disclosed in for example JP-A-2009-299645 and JP-A-2012-215155. FIG. 20 is a schematic configuration view showing an engine system including the blowby gas recirculation apparatus disclosed in JP-A-2012-215155. In this engine system, an intake port 2 of an engine 1 is connected to an intake passage 3 and an exhaust port 4 is connected to an exhaust passage 5. An air cleaner 6 is provided at an inlet of the intake passage 3 and a supercharger 7 is provided between the intake passage 3 downstream of the air cleaner 6 and the exhaust passage 5.

The supercharger 7 is arranged to rotate a turbine 9 by exhaust gas flowing in the exhaust passage 5, thereby integrally rotating a compressor 8 via a rotary shaft 10, to increase the pressure of intake air in the intake passage 3. In an exhaust bypass passage 11 provided in the exhaust passage 5 to detour the turbine 9, a waste gate valve 12 is provided with an opening degree adjusted by an actuator 19. When exhaust gas flowing in the exhaust bypass passage 11 is regulated by this valve 12, the rotation speed of the compressor 8 as well as the turbine 9 is adjusted to adjust the supercharging pressure of the supercharger 7. An intercooler 13 is provided in the intake passage 3. A surge tank 3a is provided in the intake passage 3 downstream of the intercooler 13 and a throttle valve 21 is placed in the intake passage 3 upstream of the surge tank 3a.

An intake bypass passage 41 is provided to bypass between an upstream part of the intake passage 3 from the compressor 8 and a downstream part of the intake passage 3 from compressor 8. In this intake bypass passage 41, an ejector 37 is provided to generate negative pressure by the air flowing in the passage 41. FIG. 21 is a cross sectional view showing a schematic configuration of the ejector 37. This ejector 37 is configured such that the air ejected through a nozzle 37a provided on an air inlet side generates negative pressure in a decompression chamber 37c located between a diffuser 37b provided on an air exit side and the nozzle 37a. Specifically, when air pressure is increased by the compressor 8, a pressure difference occurs between the upstream portion and the downstream part of the intake passage 3 with respect to the compressor 8, thereby generating a pressure difference between the nozzle 37a and the diffuser 37b. This pressure difference causes the air to be ejected from the nozzle 37a to the diffuser 37b, generating the negative pressure in the decompression chamber 37c.

As shown in FIG. 20, the decompression chamber 37c of the ejector 37 (see FIG. 21) is connected to an outlet of a first blowby gas returning passage 38 to be used during operation (during supercharging) of the supercharger 7. An inlet of the first blowby gas returning passage 38 is connected to a head cover 1b of the engine 1. This passage 38 is arranged to allow the blowby gas leaking from a combustion chamber 16 of the engine 1 into a crank case 1c to return to the combustion chamber 16 through the head cover 1b and the intake passage 3. In each of the head cover 1b and the crank case 1c, blowby gas is accumulated. Accordingly, during supercharging, when negative pressure is generated in the ejector 37, this generated negative pressure acts on the inside of the head cover 1b through the first blowby gas returning passage 38. Thus, the blowby gas is caused to flow from the head cover 1b into the returning passage 38, and then flow to the intake passage 3 upstream of the compressor 8 via the ejector 37 and the intake bypass passage 41. The blowby gas flowing in the intake passage 3 is returned to the combustion chamber 16 via the compressor 8, the intake passage 3 downstream of the compressor 8, and others.

On the other hand, an inlet of a second blowby gas returning passage 39 is connected to the head cover 1b to allow the blowby gas leaking from the combustion chamber 16 to return to the combustion chamber 16 again. An outlet of the second blowby gas returning passage 39 is connected to the surge tank 3a. Further, the head cover 1b is provided with a PCV valve 40 at the inlet of the second blowby gas returning passage 39. Accordingly, during non-supercharging, when negative pressure is generated in the surge tank 3a, this negative pressure acts on the head cover 1b through the second blowby gas returning passage 39. Thus, the blowby gas is caused to flow from the head cover 1b into the returning passage 39 and then flow to the surge tank 3a to return to the combustion chamber 16. The PCV valve 40 is arranged to adjust a flow rate of blowby gas to be introduced from the head cover 1b to the second blowby gas returning passage 39.

To introduce fresh air into the head cover 1b and the crank case 1c, a fresh-air introduction passage 46 is provided between the head cover 1b and the intake passage 3. Furthermore, in the first blowby gas returning passage 38, a check valve 47 is provided to block a flow of gas in an opposite direction to a direction of allowing the blowby gas to flow.

Herein, it is also conceived that the engine system including the supercharger 7 and the blowby gas returning device shown in FIG. 20 is also provided with a low-pressure-loop EGR apparatus. This low-pressure-loop EGR apparatus includes an EGR passage 17 located between the exhaust passage 5 downstream of the turbine 9 and the intake passage 3 upstream of the compressor 8, and an EGR valve 18 provided in the EGR passage 17, as shown by a chain double-dashed line in FIG. 20.

SUMMARY OF INVENTION

Problems to be Solved by the Invention

Meanwhile, in a supercharger-equipped engine system including a low-pressure-loop EGR apparatus, it is assumed that an intake bypass valve is provided in an intake bypass passage as disclosed in JP-A-2013-83339. In this case, when the EGR valve is opened to allow EGR gas to flow from the EGR passage to the intake passage, the pressure in the outlet of the compressor changes from a low pressure to a high pressure. This pressure change may cause EGR gas to flow to and remain in the pressure balance chamber of the intake bypass valve. When such remaining EGR gas is cooled, e.g., after engine stop, condensed water is generated due to water or moisture contained in the EGR gas. This condensed water may cause corrosion of a drive part in the intake bypass valve or may freeze, causing the drive part to be stuck. These situations may inhibit normal operations of the intake bypass valve.

In a case where the low-pressure-loop EGR apparatus is provided in the supercharger-equipped engine system disclosed in JP-A-2012-215155, when the EGR valve 18 is opened during supercharging, the EGR gas flowing from the EGR passage 17 to the intake passage 3 will also flow in the intake bypass passage 41 and the ejector 37. Accordingly, when EGR gas remains or accumulates in the ejector 37 and this residual EGR gas is cooled during stop of the engine 1, the condensed water may be generated even in the ejector 37. If this condensed water is frozen, the frozen condensed water may impair the operation of the ejector 37 or cause malfunction of the ejector 37. In a case where the ejector 37 is provided with a mechanism for regulating a flow rate of blowby gas, this regulation mechanism may be corroded by the condensed water and hence broken down.

In the aforementioned low-pressure-loop EGR apparatus, furthermore, when the EGR valve is closed from an open state, EGR gas may remain or accumulate in the EGR passage downstream of the EGR valve. This residual EGR gas may cause the generation of the condensed water as in the above case or the condensed water may remain in a flow passage of the EGR valve, causing similar defects to the above.

The present invention has been made in view of the circumstances and has a purpose to provide a low-pressure-loop exhaust gas recirculation apparatus of an engine to enable preventing the generation of condensed water due to residual exhaust recirculation gas in a specific part which exhaust recirculation gas flows in or through.

Means of Solving the Problems

To achieve the above purpose, one aspect of the invention provides a low-pressure-loop exhaust gas recirculation apparatus of an engine, the apparatus including: a supercharger provided between an intake passage and an exhaust passage of the engine and configured to increase pressure of intake air in the intake passage, the supercharger including a compressor placed in the intake passage, a turbine placed in the exhaust passage, and a rotary shaft connecting the compressor and the turbine so that they are integrally rotatable; an exhaust gas recirculation passage configured to allow part of exhaust gas discharged from a combustion chamber of the engine to the exhaust passage to flow as exhaust recirculation gas to the intake passage to return to the combustion chamber, the exhaust gas recirculation passage having an inlet connected to the exhaust passage downstream of the turbine and an outlet connected to the intake passage upstream of the compressor; an exhaust recirculation valve to regulate a flow of the exhaust recirculation gas in the exhaust recirculation passage; and a residual gas removal unit configured to remove exhaust recirculation gas remaining in a specific part included in the engine or the exhaust gas recirculation apparatus, the specific part being an area which the exhaust recirculation gas will flow in or through.

Advantageous Effects of Invention

According to the present invention, it is possible to prevent the generation of condensed water due to residual exhaust recirculation gas in a specific part which exhaust recirculation gas flows in or through.

DESCRIPTION OF EMBODIMENTS

First Embodiment

A detailed description of a first embodiment of a low-pressure-loop exhaust gas recirculation apparatus of an engine according to the present invention will now be given referring to the accompanying drawings.

Figure 1:
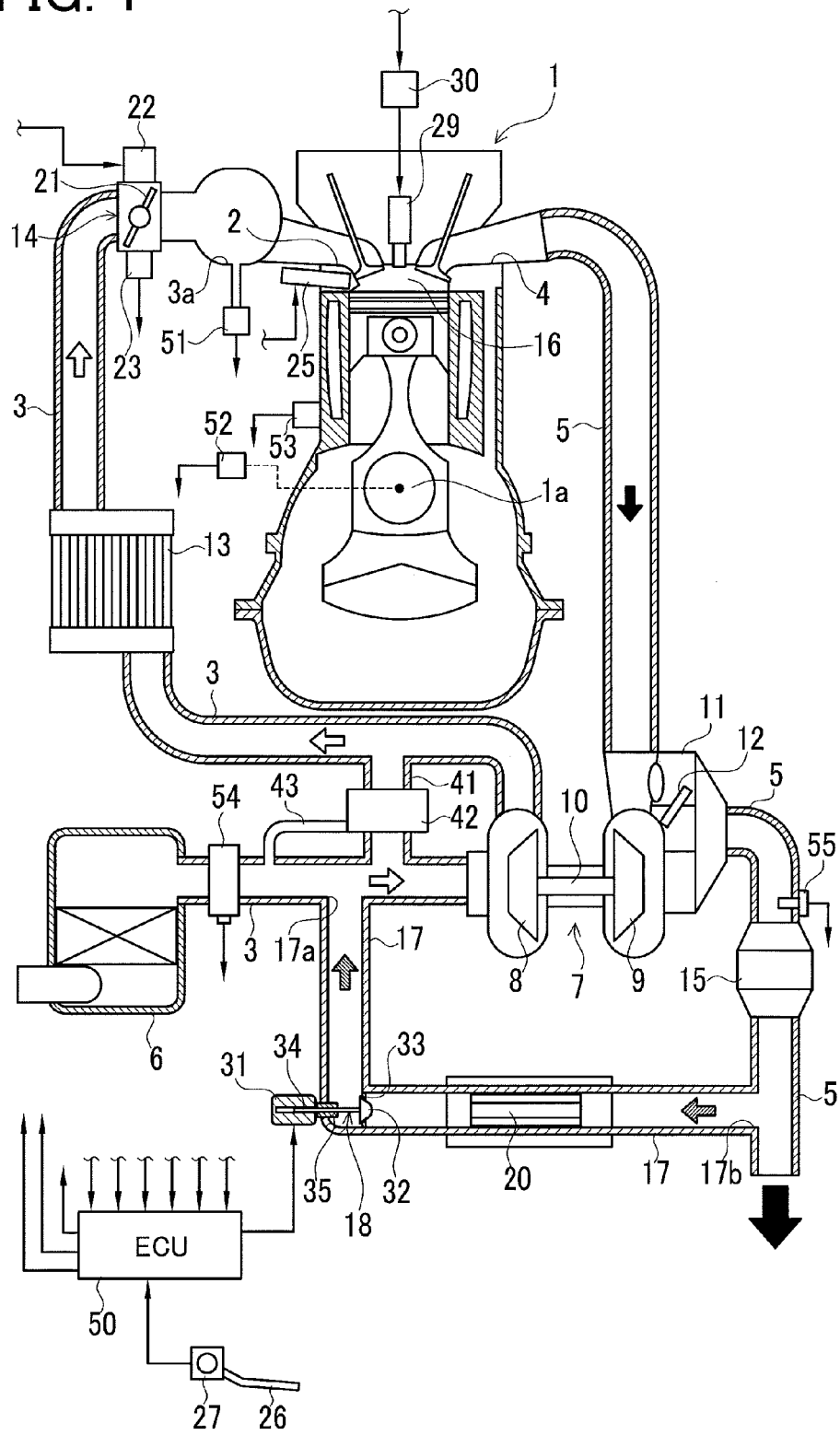
FIG. 1 is a schematic configuration view showing a supercharger-equipped gasoline engine system including a low-pressure-loop EGR apparatus in a first embodiment.

FIG. 1 is a schematic configuration view of a supercharger-equipped gasoline engine system including a low-pressure-loop exhaust gas recirculation apparatus (a low-pressure-loop EGR apparatus) in the present embodiment. This engine system includes a reciprocating engine 1. An intake port 2 of the engine 1 is connected to an intake passage 3 and an exhaust port 4 of the engine 1 is connected to an exhaust passage 5. An air cleaner 6 is provided at an inlet of the intake passage 3. A supercharger 7 is placed between the intake passage 3 downstream of the air cleaner 6 and the exhaust passage 5 to increase the pressure of intake air in the intake passage 3.

The supercharger 7 includes a compressor 8 placed in the intake passage 3, a turbine 9 placed in the exhaust passage 5, and a rotary shaft 10 that connects the compressor 8 and the turbine 9 so that they are rotatable together. The supercharger 7 is configured to rotate the turbine 9 with exhaust gas flowing in the exhaust passage 5 and integrally rotate the compressor 8 through the rotary shaft 10 in order to increase the pressure of intake air in the intake passage 3, that is, perform supercharging.

In the exhaust passage 5, adjacent to the supercharger 7, an exhaust bypass passage 11 is provided to detour the turbine 9. This bypass passage 11 is internally provided with a waste gate valve 12. When the exhaust gas flowing in the exhaust bypass passage 11 is regulated by the waste gate valve 12, adjusting the flow rate of exhaust gas to be supplied to the turbine 9, thereby adjusting the rotational speeds of the turbine 9 and the compressor 8 to control the charging pressure by the supercharger 7.

In the intake passage 3 adjacent to the supercharger 7, an intake bypass passage 41 is provided to bypass between an upstream part of the passage 3 from the compressor 8 and a downstream part of the passage 3 from the compressor 8. In this intake bypass passage 41, an intake bypass valve (hereinafter, referred to as "ABV") 42 is provided to open and close the passage 41. When an amount of intake air allowed to flow in the intake bypass passage 41 is regulated by the ABV 42, a pressure difference between the inlet and the outlet of the compressor 8 is reduced, thereby preventing surging. The ABV 42 is connected to a second end of the residual gas removal passage 43 communicating with the inside of the ABV 42 to discharge (remove) EGR gas remaining in the ABV 42. A first end of this residual gas removal passage 43 is connected to the intake passage 3 upstream of the compressor 8 and upstream of an outlet 17a of the EGR passage 17.

In the intake passage 3, an intercooler 13 is placed between the compressor 8 and the engine 1. This intercooler 13 is to cool the air whose pressure has been increased by the compressor 8 to an appropriate temperature. A surge tank 3a is provided in the intake passage 3, located between the intercooler 13 and the engine 1. An electronic throttle device 14 which is an electrically-operated throttle valve is placed in the intake passage 3 downstream of the intercooler 13 and upstream of the surge tank 3a. The electronic throttle device 14 includes a butterfly-shaped throttle valve 21 placed in the intake passage 3, a DC motor 22 to drive the throttle valve 21 to open and close, and a throttle sensor 23 to detect an opening degree (a throttle opening degree) TA of the throttle valve 21. The electronic throttle device 14 is configured such that the throttle valve 21 is driven by the DC motor 22 to open and close in response to operation of an accelerator pedal 26 by a driver to adjust the opening degree of the throttle valve 21. In the present embodiment, the electronic throttle device 14 corresponds to one example of an intake amount regulating valve of the invention. In the exhaust passage 5 downstream of the turbine 9, a catalytic converter 15 is provided as exhaust gas catalyst to purify exhaust gas.

In the engine 1, an injector(s) 25 is provided to inject and supply fuel to the combustion chamber 16. This injector 25 is supplied with fuel from a fuel tank (not shown). In the engine 1, an ignition plug 29 is provided for each cylinder. Each of the ignition plugs 29 ignites in response to high voltage output from an igniter 30. An ignition timing of each ignition plug 29 is determined by output timing of the high voltage from the igniter 30. The ignition plugs 29 and the igniter 30 constitute an ignition device.

In the present embodiment, the engine 1 is provided with a low-pressure-loop EGR apparatus. This EGR apparatus includes an exhaust gas recirculation (EGR) passage 17 allowing part of exhaust gas discharged from the combustion chamber 16 of the engine 1 to the exhaust passage 5 to flow as EGR gas in the intake passage 3 and return to the combustion chamber 16, and an exhaust gas recirculation (EGR) valve 18 placed in the EGR passage 17 to regulate an EGR flow rate in the EGR passage 17. In the present embodiment, the EGR passage 17 is provided to extend between the exhaust passage 5 downstream of the catalytic converter 15 and the intake passage 3 upstream of the compressor 8. Specifically, an inlet 17b of the EGR passage 17 is connected to the exhaust passage 5 downstream of the turbine 9 and the catalytic convertor 15 and an outlet 17a of the EGR passage 17 is connected to the intake passage 3 upstream of the compressor 8. In the EGR passage 17, an EGR cooler 20 is provided to cool EGR gas flowing in the EGR passage 17. In the present embodiment, the EGR valve 18 is located in the EGR passage 17 downstream of the EGR cooler 20.

As shown in FIG. 1, the EGR valve 18 is configured as a poppet valve and a motor-operated valve. Specifically, the EGR valve 18 is provided with a valve element 32 to be driven by a motor 31. The valve element 32 has an almost conical shape and is configured to seat on a valve seat 33 provided in the EGR passage 17. The motor 31 includes an output shaft 34 arranged to reciprocate in a straight line (stroke movement). The valve element 32 is fixed at a leading end of the output shaft 34. This output shaft 34 is supported in a housing defining the EGR passage 17 through a bearing 35. The stroke movement of the output shaft 34 of the motor 31 is performed to adjust the opening degree of the valve element 32 with respect to the valve seat 33. The output shaft 34 of the EGR valve 18 is provided to be able to make stroke movement by a predetermined stroke between a fully closed position in which the valve element 32 seats on the valve seat 33 and a fully opened position in which the valve element 32 contacts with the bearing 35. In the present embodiment, an opening area of the valve seat 33 is set larger than a conventional one in order to achieve high EGR rates. Accordingly, the valve element 32 is also designed with large size.

According to the low-pressure-loop EGR apparatus configured as above, during operation of the engine 1 and during supercharging operation of the supercharger 7, negative pressure is generated in the intake passage 3 upstream of the compressor 8. At that time, the EGR valve 18 is opened, allowing part of exhaust gas discharged from the combustion chamber 16 to the exhaust passage 5 to flow as EGR gas to the intake passage 3 upstream of the compressor 8 via the EGR passage 17, and further flow in the compressor 8 and the intake passage 3, then returning to the combustion chamber 16.

In the present embodiment, for respectively executing fuel injection control, ignition timing control, intake amount control, EGR control, supercharging control, and others according to the operating condition of the engine 1, an electronic control unit (ECU) 50 is configured to control the injectors 25, the igniter 30, the DC motor 22 of the electronic throttle device 14, and the motor 31 of the EGR valve 18 and the ABV 42 according to the operating condition of the engine 1. The ECU 50 includes a central processing unit (CPU), various memories that store a predetermined control program and others in advance and that temporarily store computational results and others of the CPU, and an external input circuit and an external output circuit connected to each of them. To the external output circuit, there are connected the igniter 30, the injectors 25, the DC motor 22, the motor 31, and the ABV 42. To the external input circuit, there are connected the throttle sensor 23 and various sensors 27 and 51-55 which correspond to one example of an operating condition detecting unit to detect the operating condition of the engine 1 and transmit various engine signals to the external input circuit.

Herein, the various sensors include the accelerator sensor 27, the intake pressure sensor 51, the rotation speed sensor 52, the water temperature sensor 53, the air flow meter 54, and the air-fuel ratio sensor 55 as well as the throttle sensor 23. The accelerator sensor 27 detects an accelerator opening degree ACC which is an operation amount of the accelerator pedal 26. The intake pressure sensor 51 detects intake pressure PM in the surge tank 3a downstream of the throttle valve 21. The rotation speed sensor 52 detects the rotation angle (crank angle) of the crank shaft 1a of the engine 1 and also detects changes in crank angle as the rotation speed (engine rotation speed) NE of the engine 1. The water temperature sensor 53 detects the cooling water temperature THW of the engine 1. The air flow meter 54 is placed in the intake passage 3 directly downstream of the air cleaner 6 and detects a flow amount Ga of intake air flowing in the intake passage 3. The air-fuel ratio sensor 55 is placed in the exhaust passage 5 directly upstream of the catalytic convertor 15 to detect an air-fuel ratio A/F in the exhaust gas.

In the present embodiment, the ECU 50 is configured to control the EGR valve 18 in the whole operating region of the engine 1 to control EGR according to the operating condition of the engine 1. Normally, the ECU 50 is also operative to control the EGR valve 18 to open based on an operating condition detected during acceleration operation or steady operation of the engine 1 and control the EGR valve 18 to fully close during stop of the engine 1, during idle operation, or during deceleration operation.

In the present embodiment, the ECU 50 is arranged to control the electronic throttle device 14 based on an accelerator opening degree ACC in order to drive the engine 1 in response to requests from a driver. The ECU 50 is further arranged to control the electronic throttle device 14 to open based on the accelerator opening degree ACC during acceleration operation or steady operation of the engine 1 and to control the electronic throttle device 14 to close during stop or deceleration operation of the engine 1. Accordingly, the throttle valve 21 is opened during acceleration operation or steady operation of the engine 1 and fully closed during stop or deceleration operation of the engine 1.

Figure 2:
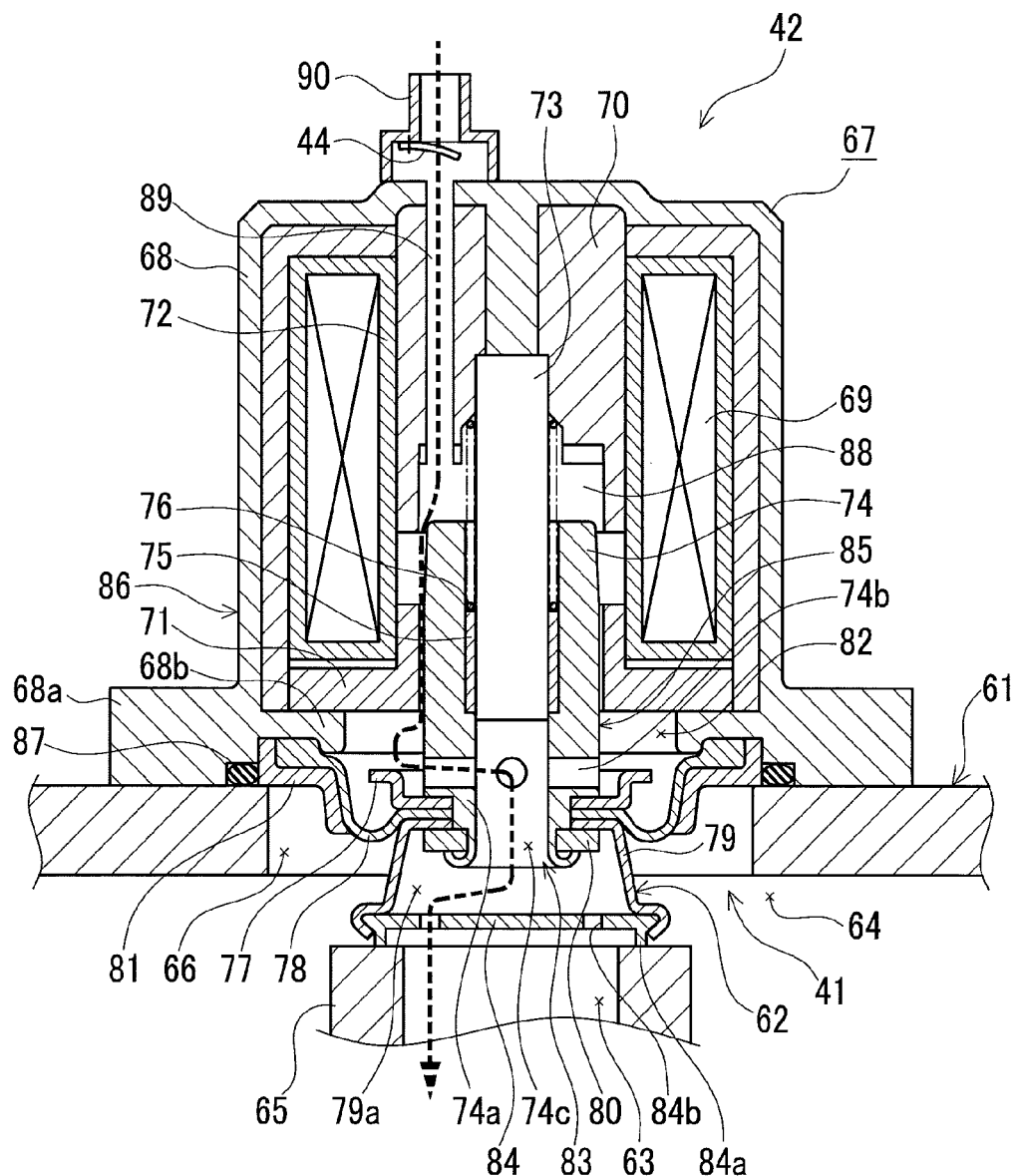
FIG. 2 is a cross sectional view showing a configuration of ABV in the first embodiment.

Next, the configuration of the ABV 42 will be explained in detail. FIG. 2 is a cross sectional view showing the configuration of the ABV 42 in the present embodiment. As shown in FIG. 2, the ABV 42 is placed in a casing 61 of the supercharger 7. The ABV 42 is installed in a vertical orientation so that an opening/closing direction of a valve member 62 mentioned later corresponds to a vertical direction (up and down direction). In the casing 61, an intake bypass passage 41 is formed. This intake bypass passage 41 includes an in-flow passage 63 and an out-flow passage 64. A valve seat 65 is formed between the in-flow passage 63 and the out-flow passage 64. In the casing 61, above the valve seat 65, a mounting hole 66 is formed in a position concentric with the valve seat 65. This mounting hole 66 has an inner diameter larger than an inner diameter of the valve seat 65.

The ABV 42 includes an electromagnetic device 67 corresponding to one example of a drive unit of the invention. The electromagnetic device 67 consists of a housing 68, a coil 69, a fixed core 70, an end plate 71, and others. The housing 68 is formed in a closed-top cylindrical shape. The coil 69 is wound around a bobbin 72 and set in the housing 68. The fixed core 70 is formed in a cylindrical shape and placed in a hollow part of the bobbin 72. The end plate 71 is formed in a circular disk shape and provided concentrically under the bobbin 72. The housing 68, fixed core 70, and end plate 71, which serve as a stator, are each made of magnetic material such as iron, thus forming a fixed magnetic circuit. At a lower end of the housing 68, a mounting flange 68a is formed to protrude radially outward. Inside the mounting flange 68a, an inner flange 68b is formed. The peripheral part of the end plate 71 is held between the inner flange 68b and the bobbin 72.

At a lower end of the fixed core 70, a guide rod 73 protruding downward is concentrically attached. On the guide rod 73, a columnar movable core 74 is fitted to be able to reciprocate up and down through a guide sleeve 75 made of resin. The movable core 74 is engaged in the hollow part of the end plate 71 with play. The movable core 74 is made of magnetic material such as iron. The guide sleeve 75 is fixed to the movable core 74 by press-fit or the like. Between the guide sleeve 75 and the fixed core 70, a coil spring 76 wound on the guide rod 73 is interposed. The coil spring 76 corresponding to one example of an elastic member biases the movable core 74 in a direction of separating the movable core 74 from the fixed core 70, that is, in a downward direction.

While the coil 69 of the electromagnetic device 67 is not excited, the movable core 74 is urged by the biasing force of the coil spring 76 in the direction of separating from the fixed core 70, that is, in the downward direction. When the coil 69 of the electromagnetic device 67 is excited, the movable core 74 is sucked or moved by the electromagnetic force toward the fixed core 70, that is, upward, against the biasing force of the coil spring 76.

The movable core 74 is formed, at its lower end, with a mounting cylindrical part 74a having an outer diameter than that of the main part of the core 74. On this cylindrical part 74a, a circular disk-shaped stopper plate 77, an annular diaphragm 78, an inverted-cup-shaped cylindrical member 79, and a stopper ring 89 are concentrically engaged in turn and fixed by caulking or deforming over the entire circumference of the lower end of the cylindrical part 74a. The outer peripheral part of the stopper plate 77 will contact with the end plate 71 in association with upward movement of the movable core 74 to inhibit further upward movement of the core 74. The diaphragm 78 is made of a rubber-like elastic material made of resin. The inner peripheral part of the diaphragm 78 is clamped between the stopper plate 77 and the cylindrical member 79.

Under a lower surface of the inner flange 68b of the housing 68, an annular diaphragm guide 81 made of resin is concentrically coupled to the flange 68. The outer peripheral part of the diaphragm 78 is clamped between the inner flange 68b and the diaphragm guide 81. Accordingly, a pressure balance chamber 82 is formed between each fixed-side member of the electromagnetic device 67 and the movable core 74 and hermetically defined.

The movable core 74 is formed with a plurality of transverse holes 74b each arranged above the stopper plate 77 so as to extend radially at equal intervals in a circumferential direction. The transverse holes 74b provide communication between a hollow part 74c of the movable core 74 and the pressure balance chamber 82. A total opening area of the holes 74b is set to be almost equal to an opening area of the hollow part 74c of the core 74. The internal space 79a of the cylindrical member 79 and the hollow part 74c and the transverse holes 74b of the movable core 74 form a continuous pressure introduction passage 83.

At a lower end of the cylindrical member 79, a shielding plate 84 made of resin is provided. This shielding plate 84 is formed in a circular disk shape. The shielding plate 84 is concentrically formed, on its lower surface, with an annular protruding valve part 84a. The shielding plate 84 is further formed with a plurality of air holes 84b each extending through the plate 84 in its thickness direction and at equal intervals in a circumferential direction. Each of the air holes 84b has a circular shape and is placed on a radially inner side of the valve part 84a. A total opening area of the air holes 84b is set to be almost equal to the opening area of the hollow part 74c of the movable core 74. A part of the shielding plate 84 excepting the air holes 84b forms a pressure receiving wall portion that will receive the pressure of air acting thereon on the radially inner side of the valve part 84a.

The shielding plate 84 is fitted in a lower open end of the cylindrical member 79 to close the open end. The shielding plate 84 is fixed concentrically and positioned in place in an up-down direction with respect to the cylindrical member 79. The caulked portion of the cylindrical member 79 is referred to as a caulked part. The pressure receiving wall part of the shielding plate 84 is placed in a positional relationship to overlap the hollow part 74c of the movable core 74 in plan view when the movable core 74 is seen in an axial direction. The air holes 84b of the shielding plate 84 are placed in a positional relationship not to overlap the hollow part 74c of the movable core 74 in plan view when the movable core 74 is seen in the axial direction. The shielding plate 84 having the valve part 84a and the cylindrical member 79 constitute the valve member 62. The movable core 74, stopper plate 77, inner peripheral part of the diaphragm 78, stopper ring 80, valve member 62, and others constitute a movable unit 85 that is able to reciprocate in an up-down direction. The housing 68, coil 69, fixed core 70, end plate 71, guide rod 73, outer peripheral part of the diaphragm 78 constitute a fixed-side member 86.

The ABV 42 is placed on the casing 61. To be specific, the housing 68 is placed on the casing 61 so as to be concentric with respect to the mounting hole 66 and to close the mounting hole 66. The mounting flange 68a of the housing 68 is fixed to the casing 61 by fastening or other techniques. The cylindrical member 79 is placed to extend from the mounting hole 66 of the casing 61 into the out-flow passage 64. The valve part 84a of the shielding plate 84 is positioned over the valve seat 65. A sealing O-ring 87 is provided between the casing 61 and the mounting flange 68a.

An escape chamber 88 is formed inside the fixed core 70 in cooperation with an upper end of the movable core 74 to permit up-down movement of the core 74. A communication passage 89 is formed in the fixed core 70 and the housing 68 to communicate the escape chamber 88 to the outside. This communication passage 89 extends to communicate with the pressure balance chamber 82 via the escape chamber 88 and a gap between the movable core 74 and the end plate 71. In the present embodiment, the pressure balance chamber 82 corresponds to one example of a specific part of the invention. EGR gas will flow through or in this pressure balance chamber 82, along with intake air flowing in the intake bypass passage 41. Herein, when the supercharger 7 is stopped together with the engine 1, EGR gas may remain in the pressure balance chamber 82. The communication passage 89 is formed to discharge remaining EGR gas in the pressure balance chamber 82 to the outside of the housing 68. At the top of the housing 68, a pipe joint 90 is fixed in correspondence with an exit of the communication passage 89. This pipe joint 90 is connected to the second end of the aforementioned residual gas removal passage 43. In the pipe joint 90, a check valve 44 including a reed valve is provided. This check valve 44 is configured to block a flow of air from the communication passage 89 toward the residual gas removal passage 43 and permit a flow of air in an opposite direction thereof.

Next, operations of the ABV 42 will be explained. During non-energization (non-excitation) of the electromagnetic device 67, the movable unit 85 including the movable core 74 is biased in the direction of separating from the fixed core 70 by the biasing force of the coil spring 76. Accordingly, the valve part 84a of the shielding plate 84 of the valve member 62 is caused to seat on the valve seat 65, establishing a valve closed state. On the other hand, during energization (excitation) of the electromagnetic device 67, the movable unit 85 is moved by the electromagnetic force in an opening direction against the biasing force of the coil spring 76. Thus, the valve part 84a is separated from the valve seat 65, establishing a valve open state.

In the valve closed state of the ABV 42, the diaphragm 78 partitions the pressure balance chamber 82 in correspondence with the out-flow passage 64. The in-flow passage 63 act on the pressure balance chamber 82 via the air holes 84b of the shielding plate 84 and the pressure introduction passage 83. Accordingly, the pressure of air applied to back and front of the valve member 62, that is, to the in-flow passage 63 side and the pressure balance chamber 82 side, is balanced. This reduces the biasing force of the coil spring 76 and the electromagnetic force of the electromagnetic device 67.

Meanwhile, during opening of the ABV 42, particularly, at the start of valve opening, most of high-pressure air flowing from the in-flow passage 63 to the out-flow passage 64 through the hollow part of the valve seat 65 will collide with the pressure receiving wall part of the shielding plate 84. Accordingly, most of the air flows in the out-flow passage 64, whereas part of the air flows in the pressure balance chamber 82 through the air holes 84b of the shielding plate 84 and the pressure introduction passage 83. At that time, dynamic pressure of the air acting on the pressure balance chamber 82 through the air holes 84b of the shielding plate 84 is lower than the dynamic pressure of the air acting on the pressure balance chamber 82 through the hollow part 74c of the movable core 74 in a case where the shielding plate 84 is not provided. Thus, the present embodiment can reduce the dynamic pressure of air acting on the pressure balance chamber 82 at the start of valve opening. As compared with the conventional art, therefore, the pressure of air in the pressure balance chamber 82 is easy to decrease, thereby achieving a shorter valve opening time required from the start to the end of valve opening. The internal space of the valve member 62 consisting of the cylindrical member 79 and the shielding plate 84 has a passage cross-sectional area larger than the opening area (flow passage area) of the hollow part 74c of the movable core 74 and the air holes 84b of the shielding plate 84. This internal space thus functions as a buffer chamber (which is the same as the internal space 79a of the cylindrical member 79) for attenuating the dynamic pressure of air which will act on the pressure balance chamber 82. The buffer chamber corresponds to an inlet-side passage of the pressure introduction passage 83.

Herein, in the ABV 42 of the present embodiment, the EGR gas flowing in the pressure balance chamber 82 may remain in the pressure balance chamber 82. When the EGR gas remaining in the ABV 42 is cooled, e.g., after stop of the engine 1, the condensed water is generated due to moisture or water contained in the EGR gas, which may inhibit normal operations of the ABV 42. In the present embodiment, in order to prevent the generation of the condensed water due to the EGR gas remaining in the ABV 42, particularly, in the pressure balance chamber 82, the ECU 50 is operative to execute the following scavenging control (residual gas removal control).

Figure 3:
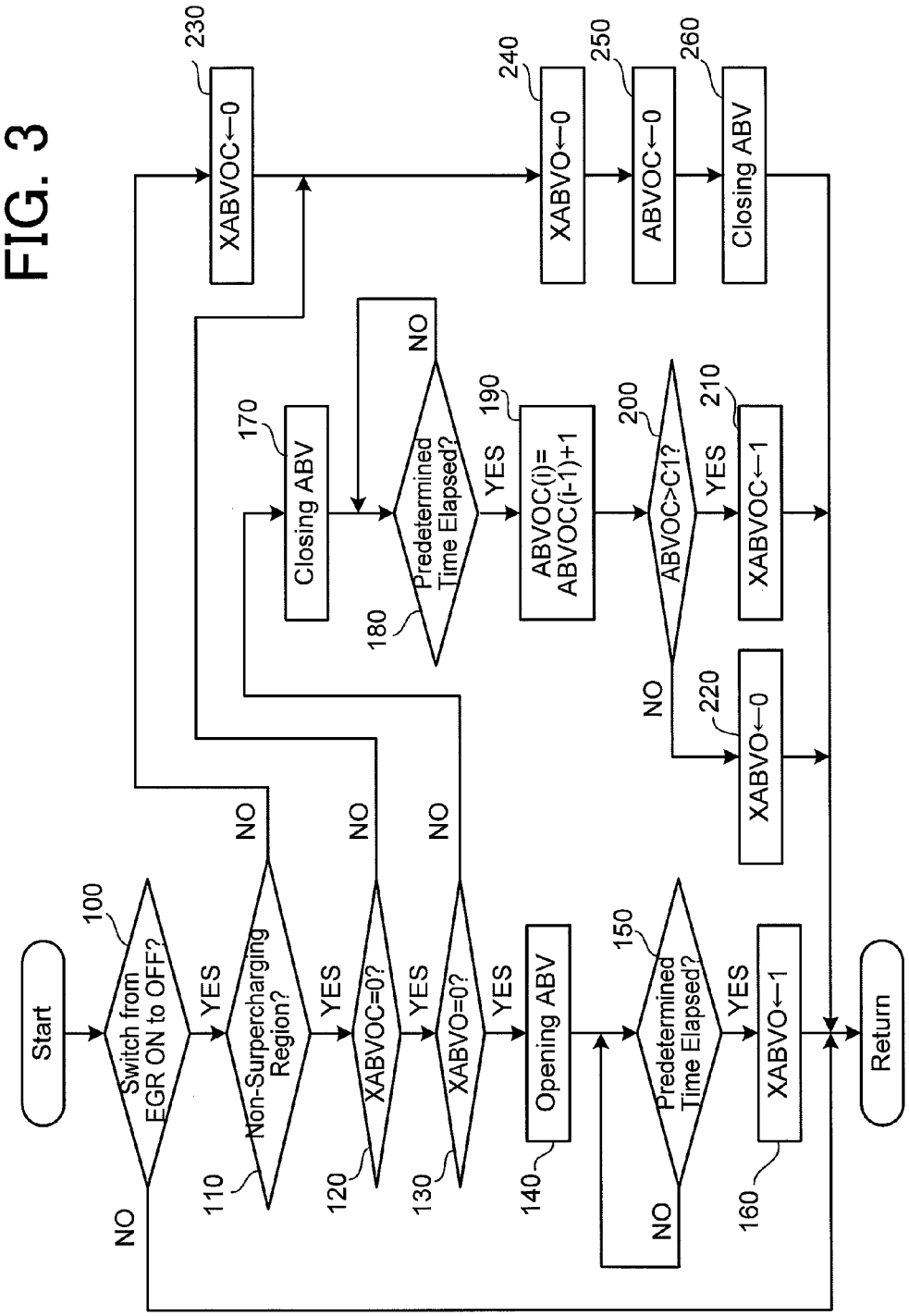
FIG. 3 is a flowchart showing one example of processing details of scavenging control (residual gas removal control) in the first embodiment.

FIG. 3 is a flowchart showing one example of processing details of this scavenging control (residual gas removal control). When the processing proceeds to this routine, the ECU 50 determines in Step 100 whether or not EGR is switched from ON to OFF. If a negative determination is made (NO) in Step 100, the ECU 50 returns the processing to Step 100. If a positive determination is made (YES) in Step 100, the ECU 50 shifts the processing to Step 110.

In Step 110, the ECU 50 determines whether or not an operating condition of the engine 1 is in a non-supercharging region. If NO in Step 110, the ECU 50 shifts the processing to Step 230. If YES in Step 110, the ECU 50 shifts the processing to Step 120.

In Step 230, the ECU 50 resets a scavenging completion determination flag XABVOC to "0". This flag XABVOC is set to "1" when scavenging of the pressure balance chamber 82 is completed by removing residual EGR gas from the pressure balance chamber 82 of the ABV 42, while it is reset to "0" when the scavenging is not completed.

In Step 240, the ECU 50 resets an ABV opening control flag XABVO to "0". This flag XABVO is set to "1" when the ABV 42 is opened, while it is reset to "0" when the ABV 42 is closed.

In Step 250, the ECU 50 resets the number ABVOC of ABV scavenging operations, which will be mentioned later, to "0". In Step 260, the ECU 50 controls the ABV 42 to close and then returns the processing to Step 100.

In Step 120, on the other hand, the ECU 50 determines whether or not the scavenging completion determination flag XABVOC is "0". If NO in Step 120, the ECU 50 shifts the processing to Step 240 and successively executes the processings of Steps 250 and 260. If YES in Step 120, the ECU 50 shifts the processing to Step 130.

In Step 130, the ECU 50 determines whether or not the ABV opening control flag XABVO is "0". If NO in Step 130, the ECU 50 shifts the processing to Step 170. If YES in Step 130, the ECU 50 shifts the processing to Step 140.

In Step 140, the ECU 50 controls the ABV 42 to open. In Step 150, the ECU 50 waits for a lapse of a predetermined time after valve opening, and then shifts the processing to Step 160. In Step 160, the ECU 50 sets the ABV opening control flag XABVO to "1", and returns the processing to Step 100.

On the other hand, in Step 170, the ECU 50 controls the ABV 42 to close. In Step 180, the ECU 50 waits for a lapse of a predetermined time after valve closing and then shifts the processing to Step 190. In Step 190, the ECU 50 calculates the current number ABVOC(i) of ABV scavenging operations by adding "1" to the previous number ABVOC(i−1) of ABV scavenging operations.

In Step 200, the ECU 50 determines whether or not the number ABVOC of ABV scavenging operations is larger than a predetermined value C1. If YES in Step 200, the ECU 50 shifts the processing to Step 210. If NO in Step 200, the ECU 50 shifts the processing to Step 220.

In Step 210, it is indicated that scavenging is completed and thus the ECU 50 sets the scavenging completion determination flag XABVOC to "1" and returns the processing to Step 100.

In Step 220, it is indicated that the ABV 42 is being closed and thus the ECU 50 resets the ABV opening control flag XABVO to "0" and returns the processing to Step 100.

In the present embodiment, the communication passage 89, pipe joint 90, and residual gas removal passage 43 correspond to one example of a residual gas removal unit of the invention. According to the above control, when the EGR is switched from ON to OFF and the operating condition of the engine 1 is in the non-supercharging region, the ECU 50 alternately repeats opening and closing of the ABV 42 by a predetermined number of times.

According to the low-pressure-loop EGR apparatus of an engine in the present embodiment explained above, the ABV 42 includes the pressure balance chamber 82 as the specific part which EGR gas flows in or through, and the communication passage 89, pipe joint 90, and residual gas removal passage 43 are provided as the residual gas removal unit to remove EGR gas remaining in the pressure balance chamber 82. Accordingly, the EGR gas remaining in the pressure balance chamber 82 of the ABV 42 can be reliably removed. This makes it possible to prevent EGR gas from remaining or accumulating in the pressure balance chamber 82, e.g., after stop of the engine 1, and to prevent the generation of condensed water due to moisture or water in the EGR gas even when the ABV 42 is cooled. Specifically, this can prevent the generation of condensed water due to residual EGR gas in the pressure balance chamber 82 which EGR gas flows in or through. Consequently, it is possible to prevent the condensed water from causing corrosion of the drive part (the electromagnetic device 67 and others) in the ABV 42 or prevent the drive part from becoming stuck due to the frozen condensed water, thus avoiding disturbance in normal operations of the ABV 42.

In the present embodiment, when the ABV 42 is shifted from the open state to the closed state, the check valve 44 is opened, thereby sucking air in the pressure balance chamber 82 from the outside of the residual gas removal passage 43. This air reduces the concentration of EGR gas remaining in the pressure balance chamber 82. Thereafter, when the ABV 42 is shifted from the closed state to the open state, the check valve 44 is closed, thereby discharging the EGR gas with the concentration reduced in the pressure balance chamber 82 to the in-flow passage 63. By repeating the above operations, the concentration of EGR gas remaining in the 82 can be reduced to a predetermined value or less. Herein, even when the residual EGR gas is not completely eliminated (removed) from the pressure balance chamber 82, no problem occurs because the condensed water is not generated even if the ABV 42 is cooled after stop of the engine 1 as long as the concentration of the residual EGR gas is equal to or less than a predetermined value.

Second Embodiment

A second embodiment of a low-pressure-loop EGR apparatus of an engine according to the invention will be explained below in detail, referring to accompanying drawings.

In each of the embodiments which will be explained below, similar or identical parts to those in the first embodiment are not explained repeatedly and differences therefrom are mainly explained.

Figure 4:
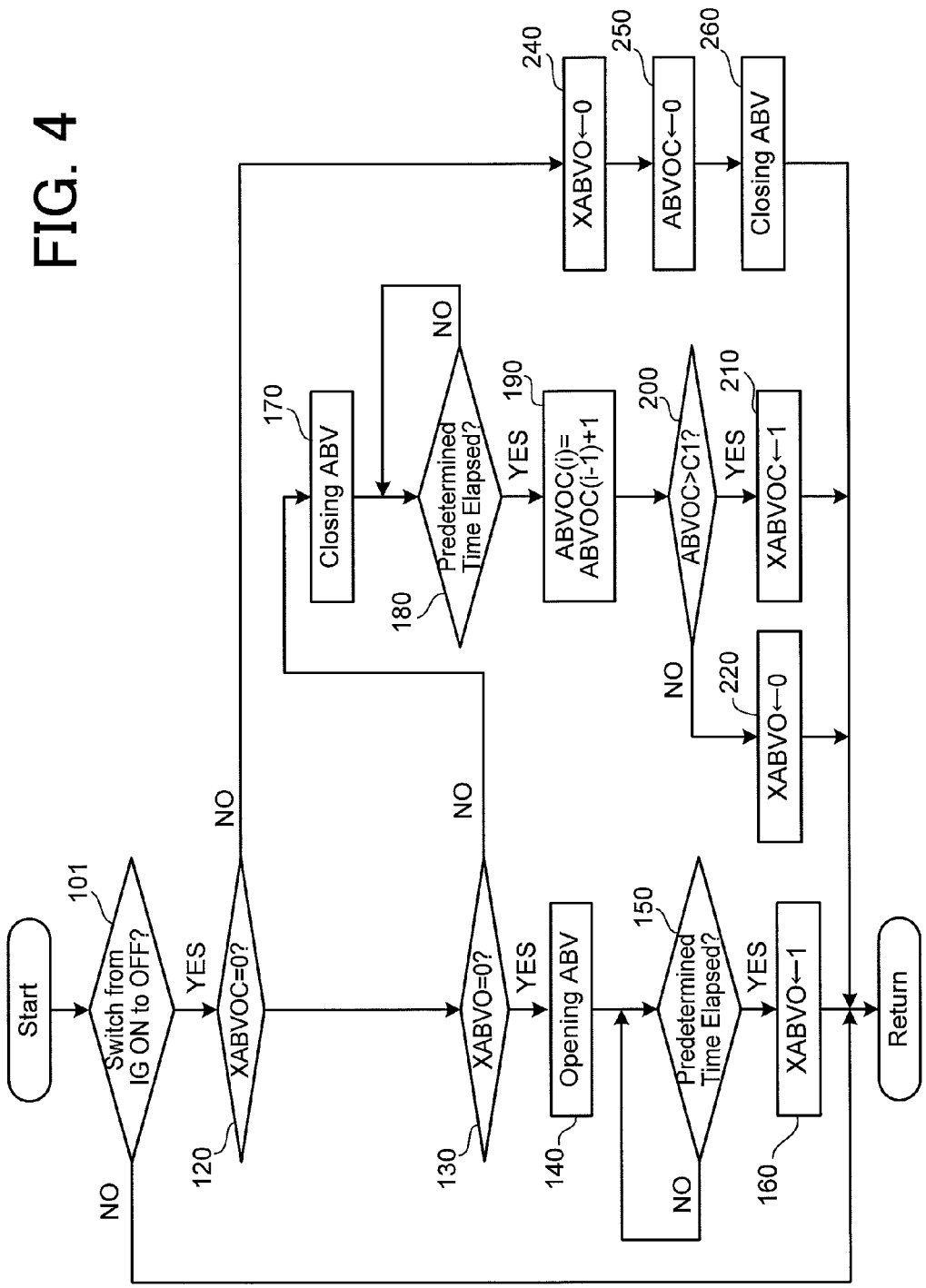
FIG. 4 is a flowchart showing one example of processing details of scavenging control (residual removal control) in a second embodiment.

The second embodiment differs from the first embodiment in the processing details of scavenging control (residual gas removal control). FIG. 4 is a flowchart showing one example of processing details of scavenging control (residual gas removal control). This flowchart differs from the flowchart of FIG. 3 in that the Step 100 is changed to Step 101 and Steps 110 and 230 are omitted.

In the first embodiment, the condition for enabling the scavenging (the condition for removing residual EGR gas) is defined by EGR cut and non-supercharging. In the second embodiment, on the other hand, this condition for enabling the scavenging (the condition for removing residual EGR gas) is defined by engine stop. Specifically, in Step 101, when an ignition key (IG) is switched from ON to OFF, the scavenging is performed (residual EGR gas is removed).

According to the present embodiment, in addition to the operations and effects of the first embodiment, it is possible to remove EGR gas remaining in the pressure balance chamber 82 of the ABV 42 from the pressure balance chamber 82 after the engine 1 is stopped, regardless of the running condition of a vehicle. Thus, the operation of the engine 1 is not affected.

Third Embodiment

A third embodiment of a low-pressure-loop EGR apparatus of an engine according to the invention will be explained below in detail, referring to accompanying drawings.

Figure 5:
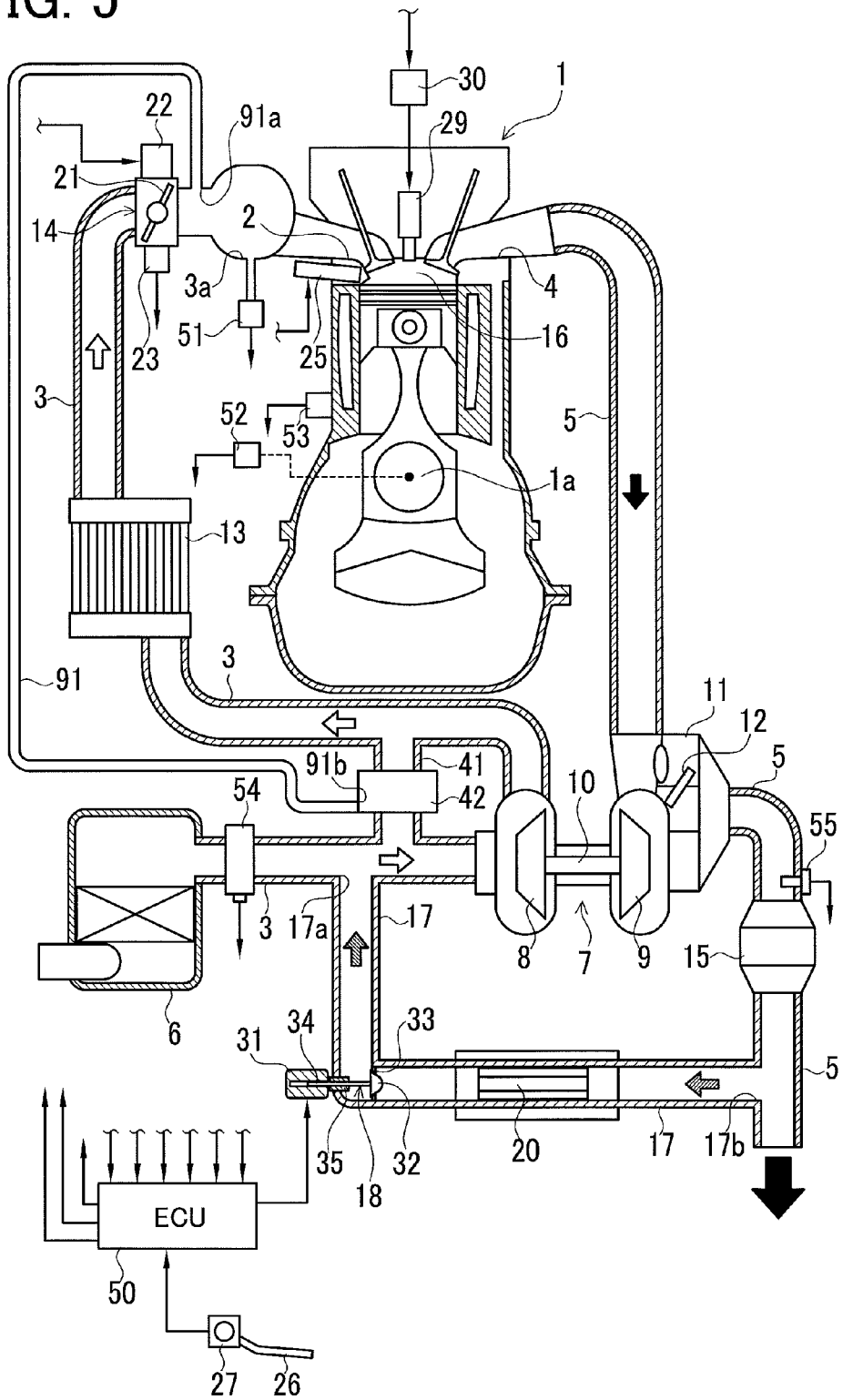
FIG. 5 is a schematic configuration view showing a supercharger-equipped gasoline engine system including a low-pressure-loop EGR apparatus in a third embodiment.

FIG. 5 is a schematic configuration view showing a supercharger-equipped gasoline engine system including a low-pressure-loop EGR apparatus of the third embodiment. The gasoline engine system of this embodiment differs from the gasoline engine system in FIG. 1 in that a residual gas removal passage 91 is provided instead of the residual gas removal passage 43. Specifically, the pipe joint 90 provided in the ABV 42 is connected and communicated to a second 91*b* of the residual gas removal passage 91. A first end 91*a* of the same passage 91 is connected and communicated to the intake passage 3 downstream of the electronic throttle device 14.

Figure 6:
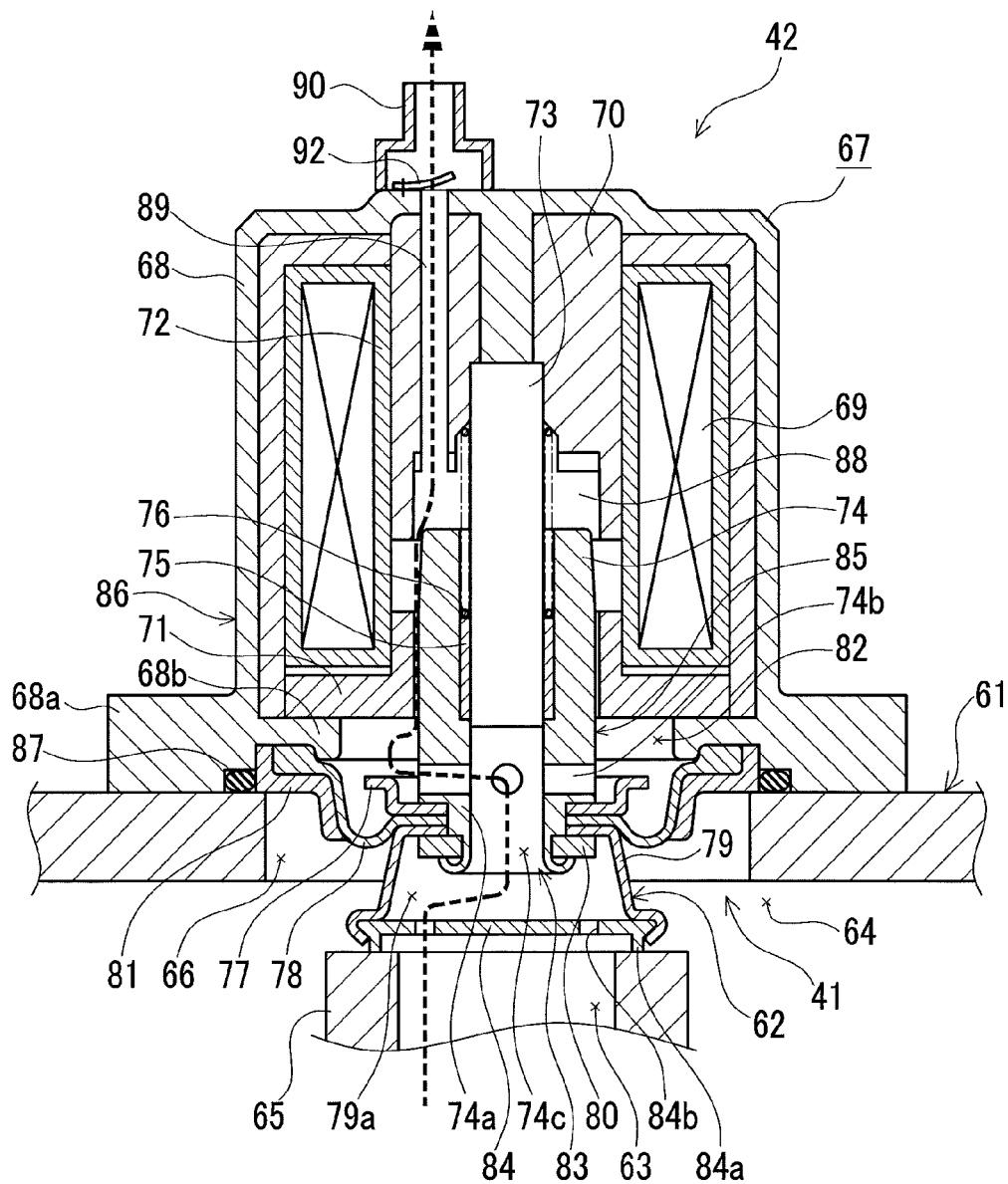
FIG. 6 is a cross sectional view of a configuration of ABV in the third embodiment.

FIG. 6 is a cross sectional view showing a configuration of the ABV 42 of the third embodiment. The ABV 42 in FIG. 6 differs from the ABV 42 in FIG. 2 in that a check valve 92 is provided instead of the check valve 44. This check valve 92 is attached to an outlet surface of the communication passage 89 of the housing 68 and configured to permit a flow of gas from the communication passage 89 toward the residual gas removal passage 91 but block a flow of gas from the residual gas removal passage 91 toward the communication passage 89. In the present embodiment, the communication passage 89, pipe joint 90, and residual gas removal passage 91 correspond to one example of the residual gas removal unit of the invention.

According to the present embodiment, the negative pressure generated in the intake passage 3 downstream of the throttle valve 21 during operation of the engine 1 acts on the pressure balance chamber 82 of the ABV 42 through the residual gas removal passage 91 and others. The EGR gas remaining in the pressure balance chamber 82 is sucked to the intake passage 3 downstream of the throttle valve 21 via the residual gas removal passage 91 and others and thus removed from the chamber 82. This can prevent the generation of condensed water, due to the residual EGR gas, in the pressure balance chamber 82 which EGR gas flows in or through. Furthermore, the negative pressure in the intake passage 3 downstream of the throttle valve 21 can be utilized to remove the residual EGR gas in the pressure balance chamber 82 of the ABV 42 and thus discharge the removed EGR gas to the intake passage 3 downstream of the throttle valve 21.

According to the embodiment, since EGR is cut in an engine light load (idle, deceleration) region, fresh air is supplied to the in-flow passage 63 and the out-flow passage 64. This fresh air is caused to flow in the pressure balance chamber 82 through the air holes 84b, thereby scavenging the pressure balance chamber 82. In other words, the EGR gas remaining in the pressure balance chamber 82 is removed (discharged) to the surge tank 3a through the communication passage 89, check valve 92, pipe joint 90, and residual gas removal passage 91. At that time, the engine 1 is running under light load and the throttle valve 21 is closed, and thus the surge tank 3a is in a negative pressure state. This negative pressure acts to suck the EGR gas remaining in the pressure balance chamber 82 and discharge (remove) the gas therefrom. On the other hand, while the surge tank 3a is in a normal pressure state, the check valve 92 is held closed, so that EGR gas discharged to the surge tank 3a is not allowed to return from the residual gas removal passage 91 to the communication passage 89. By repetion of the above operations, the concentration of EGR gas remaining in the pressure balance chamber 82 can be reduced to a predetermined value or less. Even if the residual EGR gas is not completely removed from the pressure balance chamber 82, no problem occurs. This is because even if the engine 1 is stopped and the intake bypass valve 42 is cooled, the residual EGR gas does not produce condensed water as long as the concentration is equal to or less than the predetermined value.

In the present embodiment, during deceleration of the engine 1, the negative pressure in the intake passage 3 can be introduced to the escape chamber 88 of the ABV 42 through the residual gas removal passage 91 and others. This can enhance responsivity of the ABV 42 to operate from the closed state to the open state.

In the present embodiment, the check valve 92 permits a flow of gas from the pressure balance chamber 82 toward the residual gas removal passage 91 but blocks a back-flow of gas from the residual gas removal passage 91 toward the pressure balance chamber 82 during supercharging of the engine 1, for example. This can protect the pressure balance chamber 82 from the back-flow of gas during supercharging of the engine 1, for example.

Fourth Embodiment

A fourth embodiment of a low-pressure-loop EGR apparatus of an engine according to the invention will be explained below in detail, referring to accompanying drawings.

Figure 7:
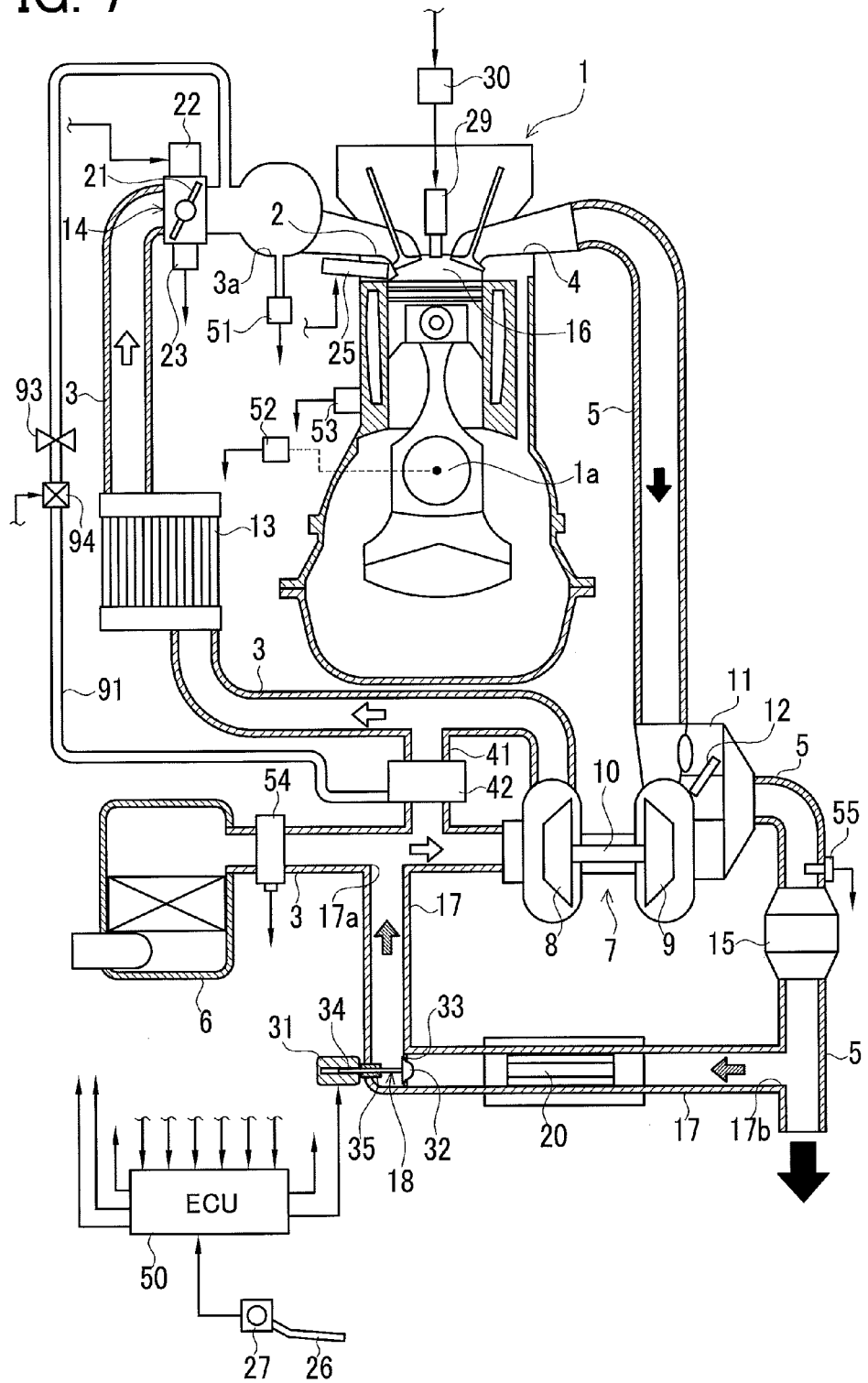
FIG. 7 is a schematic configuration view showing a supercharger-equipped gasoline engine system including a low-pressure-loop EGR apparatus in a fourth embodiment.
Figure 8:
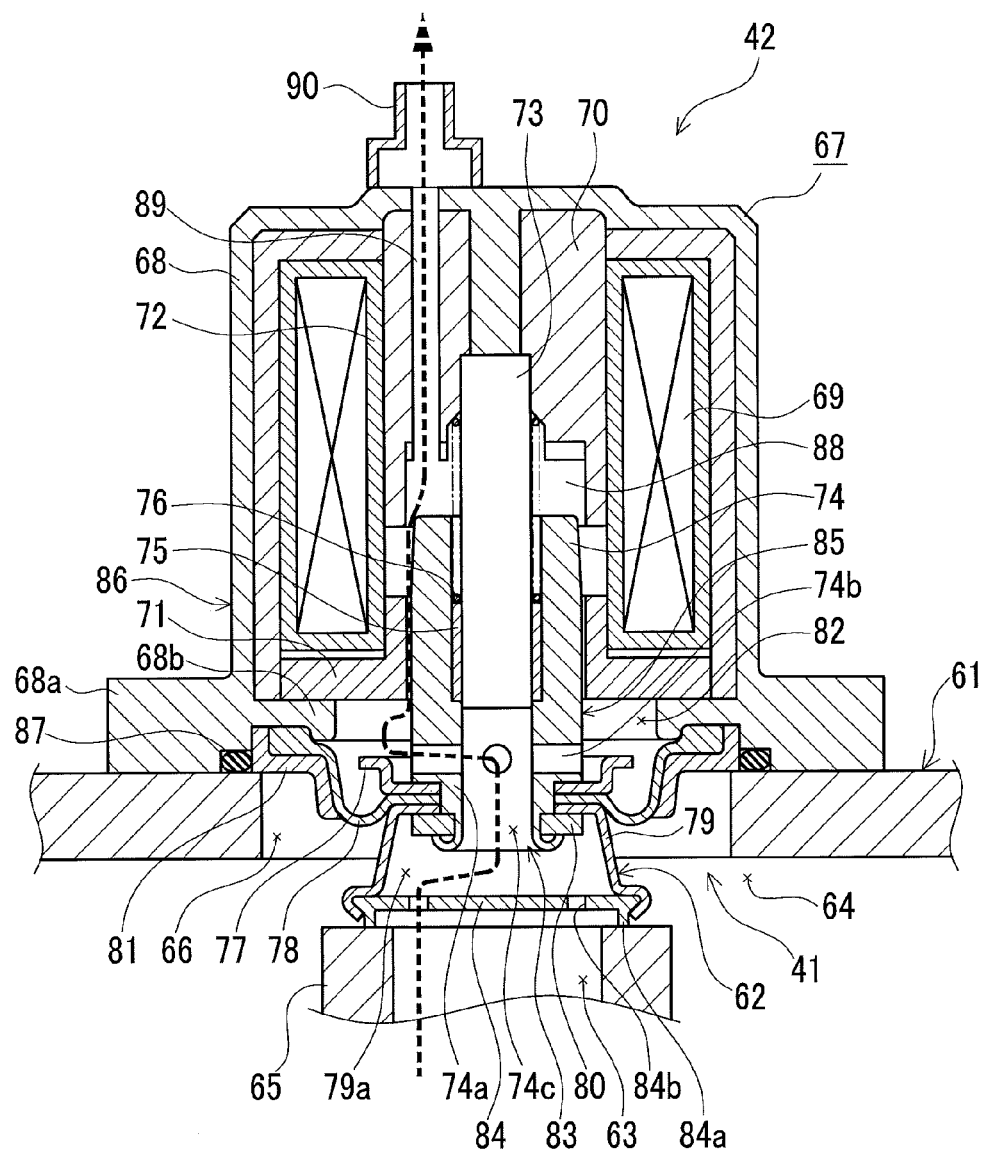
FIG. 8 is a cross sectional view of a configuration of ABV in the fourth embodiment.

FIG. 7 is a schematic configuration view showing a supercharger-equipped gasoline engine system including a low-pressure-loop EGR apparatus in the fourth embodiment. This gasoline engine system differs from the gasoline engine system of FIG. 5 in that a restrictor 93 and a VSV 94 serving as an opening and closing valve are provided in the residual gas removal passage 91. The VSV 94 is an electromagnetic valve to be controlled by the ECU 50 to open and close. In the present embodiment, the ECU 50 corresponds to one example of an opening and closing control unit of the invention. FIG. 8 is a cross sectional view showing a configuration of the ABV 42 of the present embodiment. The ABV 42 of FIG. 8 differs from the ABV 42 of FIGS. 2 and 6 in the check valves 44 and 92 are not provided.

Figure 9:
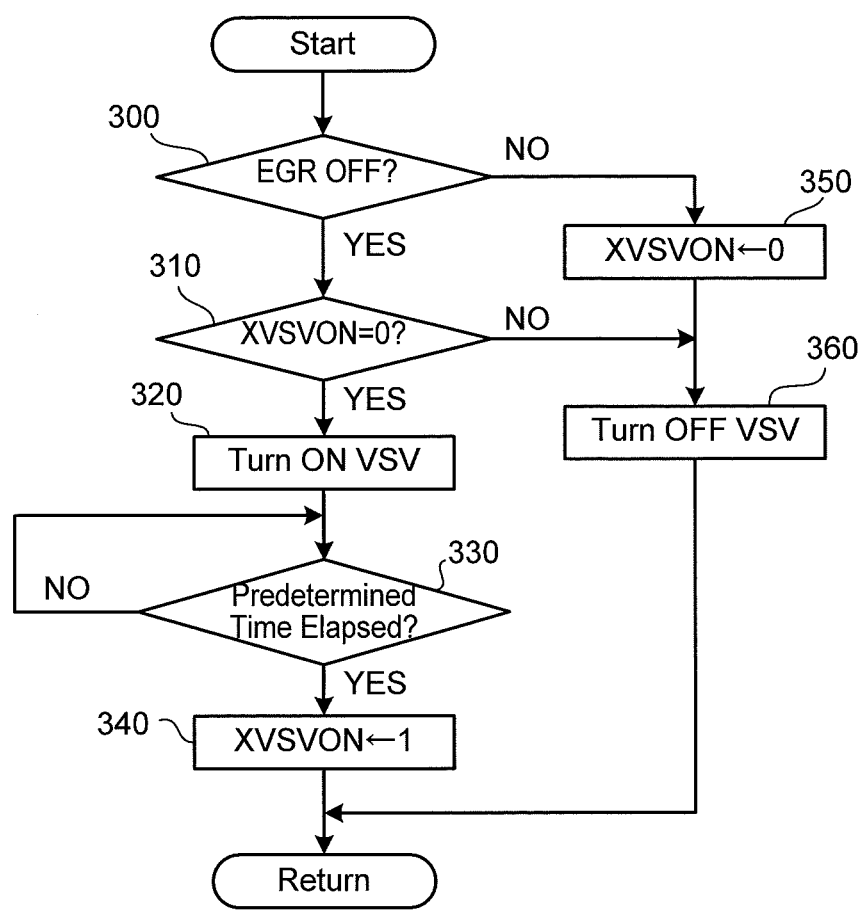
FIG. 9 is a flowchart showing one example of control details of VSV in the fourth embodiment.

FIG. 9 is a flowchart showing one example of control details of the VSV 94. The ECU 50 determines in Step 300 whether or not EGR is off (EGR is cut). If YES in Step 300, the ECU 50 shifts the processing to Step 310. If NO in Step 300, the ECU 50 shifts the processing to Step 350.

In Step 350, the ECU 50 resets a VSV-ON flag XVSVON to "0". Thereafter, in Step 360, the ECU 50 controls the VSV 94 to turn off and then returns the processing to Step 300.

In Step 310, on the other hand, the ECU 50 determines whether or not the VSV-ON flag XVSVON is "0". If NO in Step 310, the ECU 50 shifts the processing to Step 360. If YES in Step 310, the ECU 50 shifts the processing to Step 320.

In Step 320, the ECU 50 controls the VSV 94 to turn on. Thereafter, the ECU 50 waits for a lapse of a predetermined time in Step 330, sets the VSV-ON flag XVSVON to "1" in Step 340, and then returns the processing to Step 300.

According to the above control, the ECU 50 drives the VSV 94 by the ON control only under the condition that EGR is cut (EGR is off) to thereby open the VSV 94. In the present embodiment, therefore, in addition to the operations and effects of the third embodiment, a scavenging condition for removing the residual EGR gas from the pressure balance chamber 82 of the ABV 42 to scavenge the chamber 82 can be limited to the EGR cut condition in which the EGR valve 18 is closed. This can reduce the amount of residual EGR gas flowing to the surge tank 3a. This is to suppress EGR gas containing fine particles of exhaust gas from entering the surge tank 3a.

In the present embodiment, an amount of the gas allowed to flow through the residual gas removal passage 91 is restricted to a small value by the restrictor 93. This can prevent an excessive amount of intake air containing EGR gas from becoming discharged from the pressure balance chamber 82 of the ABV 42 to the intake passage 3 to which the intake air will be discharged.

In the present embodiment, the VSV 94 is controlled to open by the ECU 50 when the EGR valve 18 is closed, a flow of gas from the pressure balance chamber 82 toward the residual gas removal passage 91 is permitted. On the other hand, the VSV 94 is controlled to close by the ECU 50 when the EGR valve 18 is opened, a back-flow of gas from the residual gas removal passage 91 to the pressure balance chamber 82 is blocked. Thus, the pressure balance chamber 82 can be protected from the back-flow of gas during supercharging of the engine 1, for example.

Fifth Embodiment

A fifth embodiment of a low-pressure-loop EGR apparatus of an engine according to the invention will be explained below in detail, referring to accompanying drawings.

Figure 10:
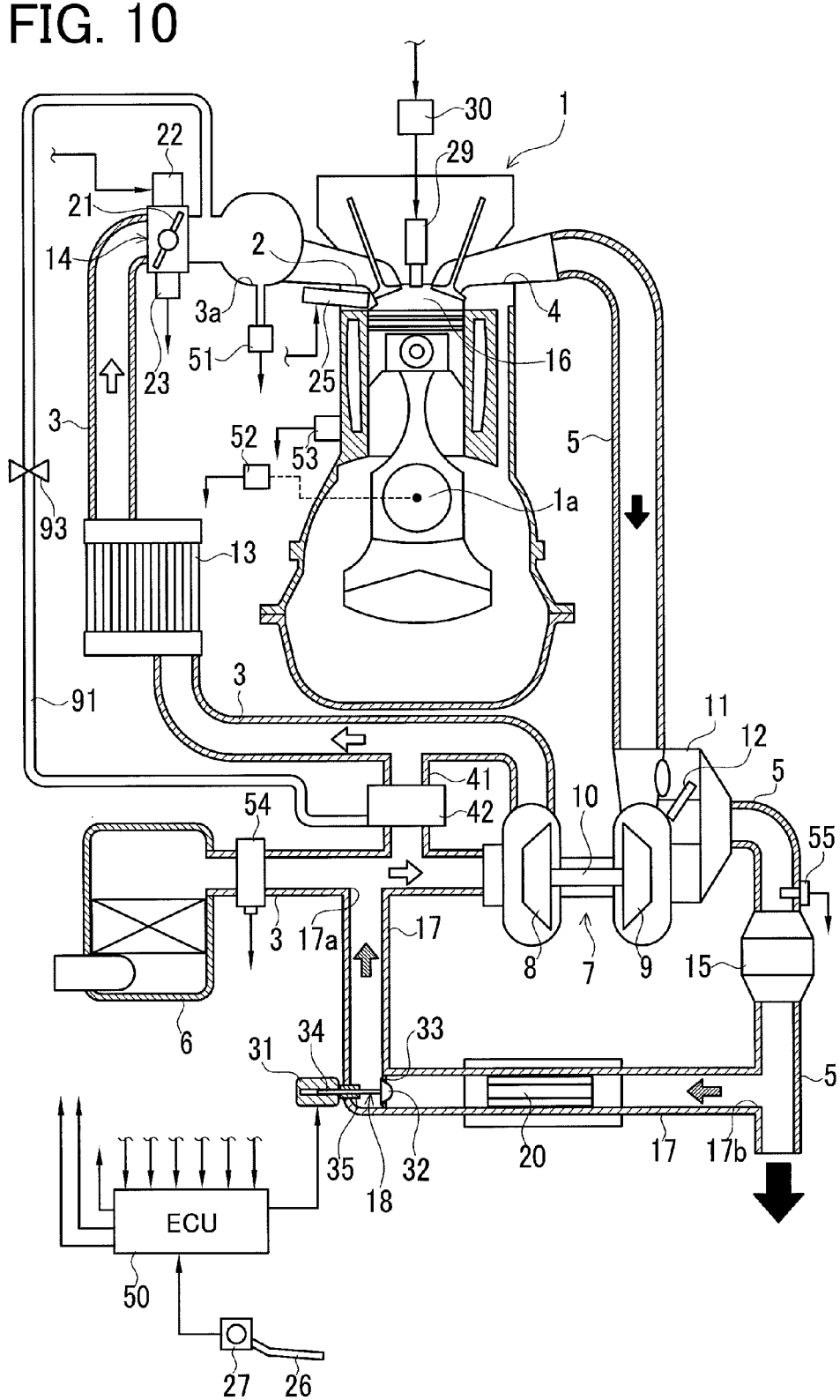
FIG. 10 is a schematic configuration view showing a supercharger-equipped gasoline engine system including a low-pressure-loop EGR apparatus in a fifth embodiment.

FIG. 10 is a schematic configuration view of a supercharger-equipped gasoline engine system including a low-pressure-loop EGR apparatus in the fifth embodiment. This gasoline engine system differs from the gasoline engine system of FIG. 7 in that only the restrictor 93 is provided in the residual gas removal passage 91 and the VSV 94 is omitted.

In the third embodiment, during deceleration operation and idle operation of the engine 1, the amount of gas flowing from the ABV 42 to the intake passage 3 via the residual gas removal passage 91 and others is influenced mainly by the size of a clearance or gap of a sliding part (between the end plate 71 and the movable core 74) in the ABV 42. If this clearance of the sliding part becomes large due to variations due to product tolerance of each ABV 42 or aging abrasion, some defects may occur, for example the deceleration of the engine 1 is deteriorated or the engine rotation speed during idle rises. According to the present embodiment, the restrictor 93 is provided in the residual gas removal passage 91, thereby enabling preventing excessive gas from flowing in the surge tank 3a through the residual gas removal passage 91. In addition, the present embodiment can also achieve the same operations and effects as in the third embodiment.

Sixth Embodiment

A sixth embodiment of a low-pressure-loop EGR apparatus of an engine according to the invention will be explained below in detail, referring to accompanying drawings.

Figure 11:
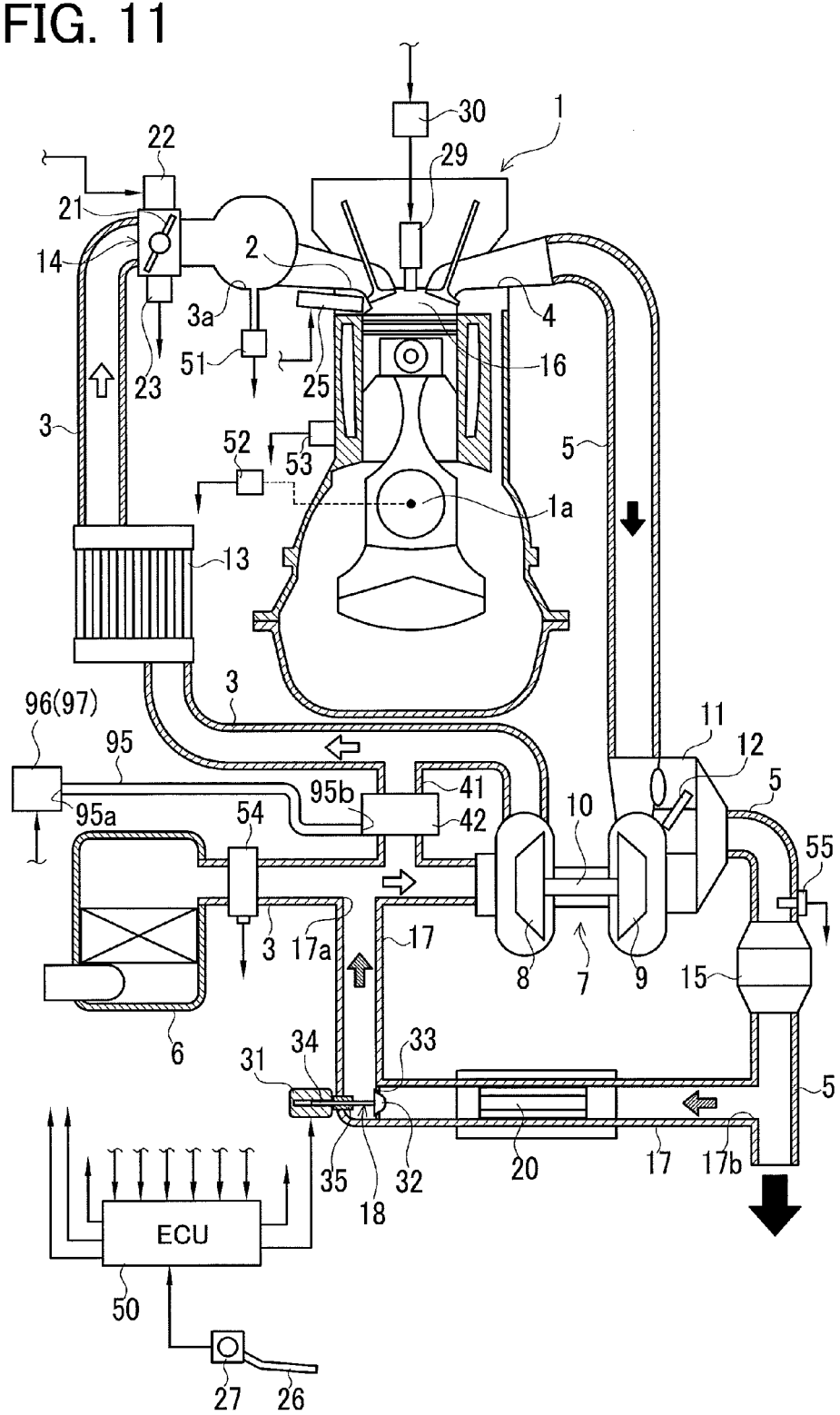
FIG. 11 is a schematic configuration view showing a supercharger-equipped gasoline engine system including a low-pressure-loop EGR apparatus in a sixth (seventh) embodiment.

FIG. 11 is a schematic configuration view of a supercharger-equipped gasoline engine system including a low-pressure-loop EGR apparatus of the sixth embodiment. This gasoline engine system differs from the gasoline engine system of FIG. 1 in that a residual gas removal passage 95 is provided instead of the residual gas removal passage 43 and a pressurizing pump 96 is further provided in the residual gas removal passage 95. Specifically, the pipe joint 90 provided in the ABV 42 is connected to a second end 95b of the residual gas removal passage 95. A first end 95a of the residual gas removal passage 95 is connected to a discharge outlet of the pressurizing pump 96. The pressurizing pump 96 is an electrically-operated pump and is driven under the control of the ECU 50. In the present embodiment, the ECU 50 corresponds to one example of a pressurizing pump control unit to control the pressurizing pump 96. In the present embodiment, the residual gas removal passage 95, pressurizing pump 96, and ECU 50 correspond to one example of the residual gas removal unit of the invention.

Figure 12:
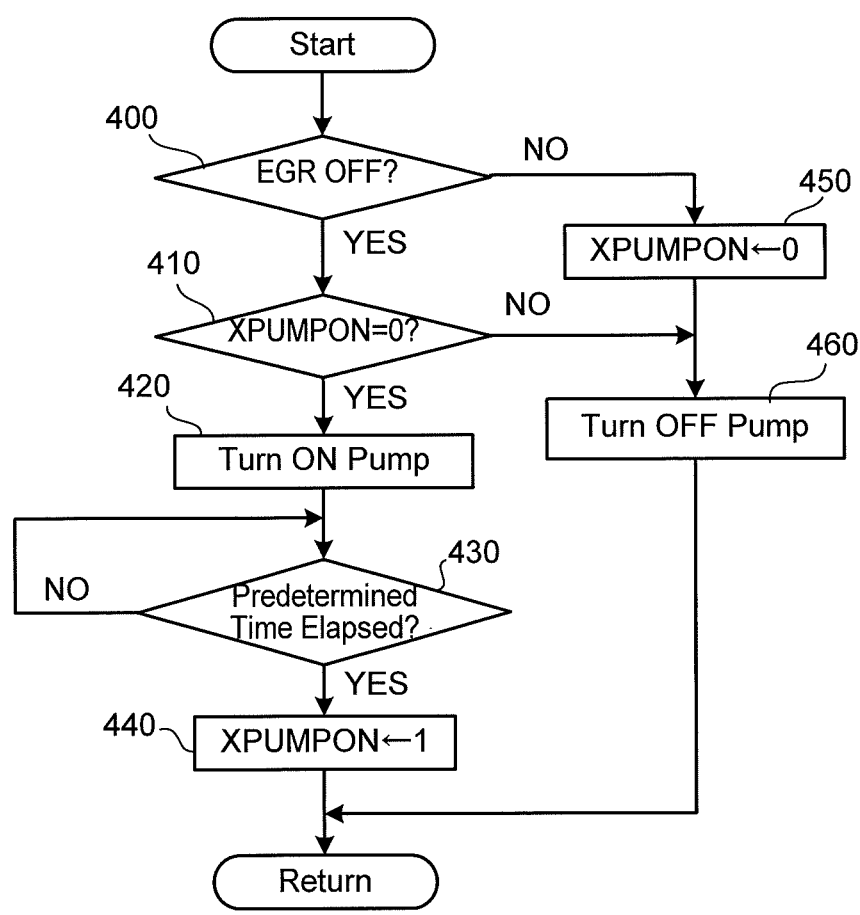
FIG. 12 is a flowchart showing one example of control details of a pressurizing pump in the sixth embodiment.

FIG. 12 is a flowchart showing one example of control details of the pressurizing pump 96. The ECU 50 determines in Step 400 whether or not the EGR is off (EGR is cut). If YES in Step 400, the ECU 50 shifts the processing to Step 410. If NO in Step 400, the ECU 50 shifts the processing to Step 450.

In Step 450, the ECU 50 resets a pump-ON flag XPUMPON to "0". In Step 460, the ECU 50 then controls the pressurizing pump 96 to turn off and then returns the processing to Step 400. On the other hand, in Step 410, the ECU 50 determines whether or not the pump-ON flag XPUMPON is "0". If NO in Step 410, the ECU 50 shifts the processing to Step 460. If YES in Step 410, the ECU 50 shifts the processing to Step 420.

In Step 420, the ECU 50 controls the pressurizing pump 96 to turn on. The ECU 50 waits for a lapse of a predetermined time in Step 430 and then sets the pump-ON flag XPUMPON to "1" in Step 440, and then returns the processing to Step 400.

According to the above control, the ECU 50 drives the pressurizing pump 96 by the ON control only under the condition that the EGR valve 18 is closed, that is, the EGR is cut (EGR is off), to supply compression air to the residual gas removal passage 95. According to the present embodiment, when the compression air is supplied to the pressure balance chamber 82 which EGR gas flows in or through, residual EGR gas is pushed out of the pressure balance chamber 82. This can prevent the generation of condensed water due to the residual EGR gas in the pressure balance chamber 82. Furthermore, the compression air can be directly supplied to the pressure balance chamber 82 of the ABV 42 via the residual gas removal passage 95 and others. Accordingly, the EGR gas remaining in the pressure balance chamber 82 can be pushed out by pressure to the in-flow passage 63 and others via the transverse holes 74b, hollow part 74c, internal space 79a of the cylindrical member 79, and air holes 84b of the shielding plate 84, and thus can be reliably removed from the pressure balance chamber 82. Thus the pressure balance chamber 82 can be reliably scavenged. When the pressurizing pump 96 is operated at arbitrary timing, EGR gas remaining in the pressure balance chamber 82 can be removed at arbitrary timing.

Seventh Embodiment

A seventh embodiment of a low-pressure-loop EGR apparatus of an engine according to the invention will be explained below in detail, referring to accompanying drawings.

The gasoline engine system of the seventh embodiment shown in FIG. 11 differs from that of the sixth embodiment in that a negative pressure pump 97 is provided instead of the pressurizing pump 96 in the residual gas removal passage 95. The control details of the negative pressure pump 97 conform to the flowchart of FIG. 12. In the present embodiment, the ECU 50 corresponds to one example of a negative pressure pump control unit to control the negative pressure pump 97. In the present embodiment, the residual gas removal passage 95, negative pressure pump 97, and ECU 50 correspond to one example of the residual gas removal unit of the invention.

According to the present embodiment, the ECU 50 drives the negative pressure pump by the ON control only when the EGR valve 18 is closed, that is, when the EGR is cut (EGR is off), to supply negative pressure to the residual gas removal passage 95. Accordingly, in the present embodiment, when the negative pressure is supplied to the pressure balance chamber 82 which EGR gas flows in or through, residual EGR gas is sucked out from the pressure balance chamber 82. This can prevent the generation of condensed water due to the residual EGR gas in the pressure balance chamber 82. Furthermore, the negative pressure acts on the pressure balance chamber 82 via the residual gas removal passage 95 and others, causing the EGR gas remaining in the pressure balance chamber 82 to be sucked out of the pressure balance chamber 82 via the residual gas removal passage 95 and others. Thus, the pressure balance chamber 82 can be reliably scavenged. Accordingly, when the negative pressure pump 97 is operated at arbitrary timing, the EGR gas remaining in the pressure balance chamber 82 can be removed at arbitrary timing.

Eighth Embodiment

An eighth embodiment of a low-pressure-loop EGR apparatus of an engine according to the invention will be explained below in detail, referring to accompanying drawings.

Figure 13:
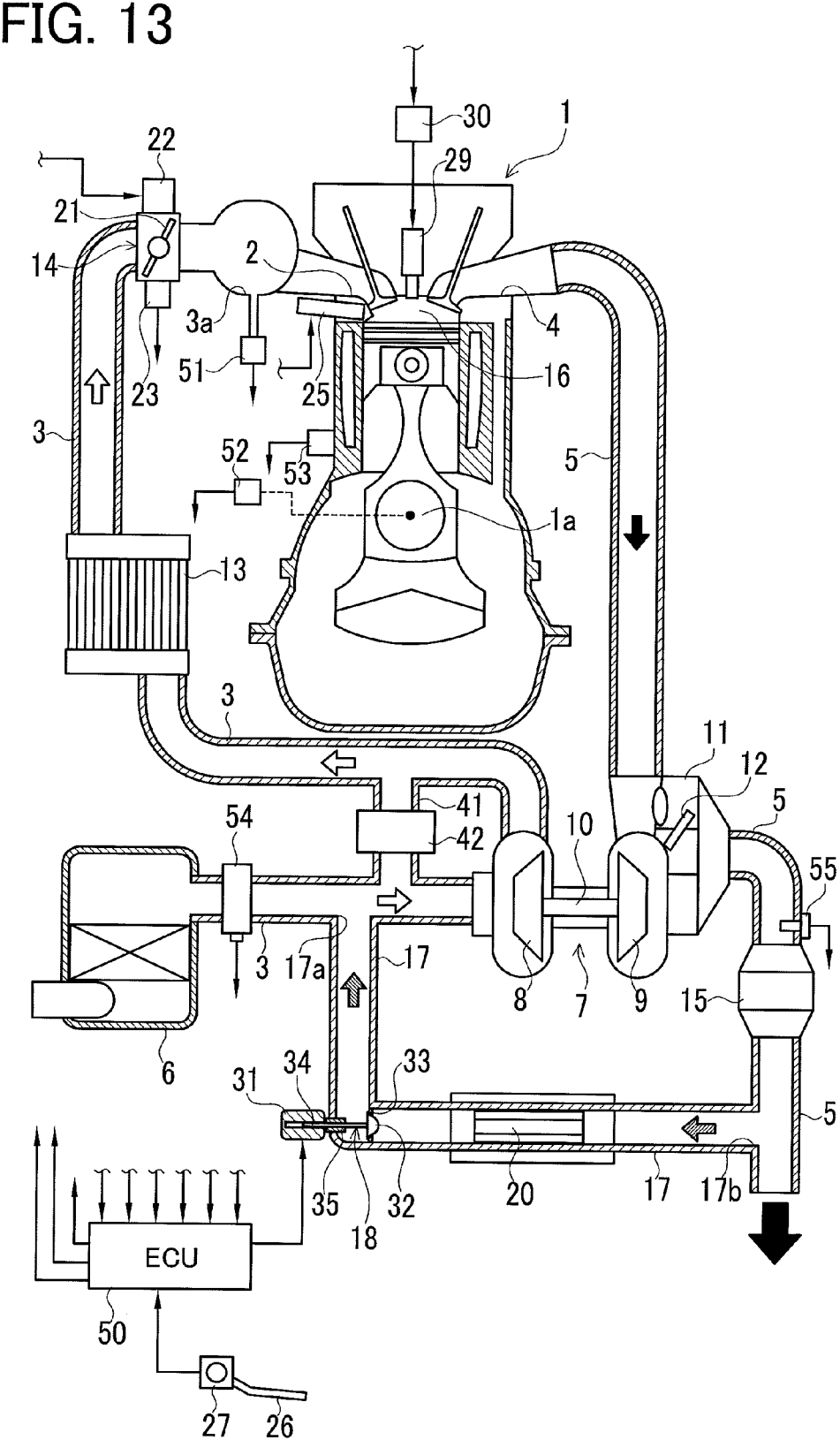
FIG. 13 is a schematic configuration view showing a supercharger-equipped gasoline engine system including a low-pressure-loop EGR apparatus in an eighth embodiment.
Figure 14:
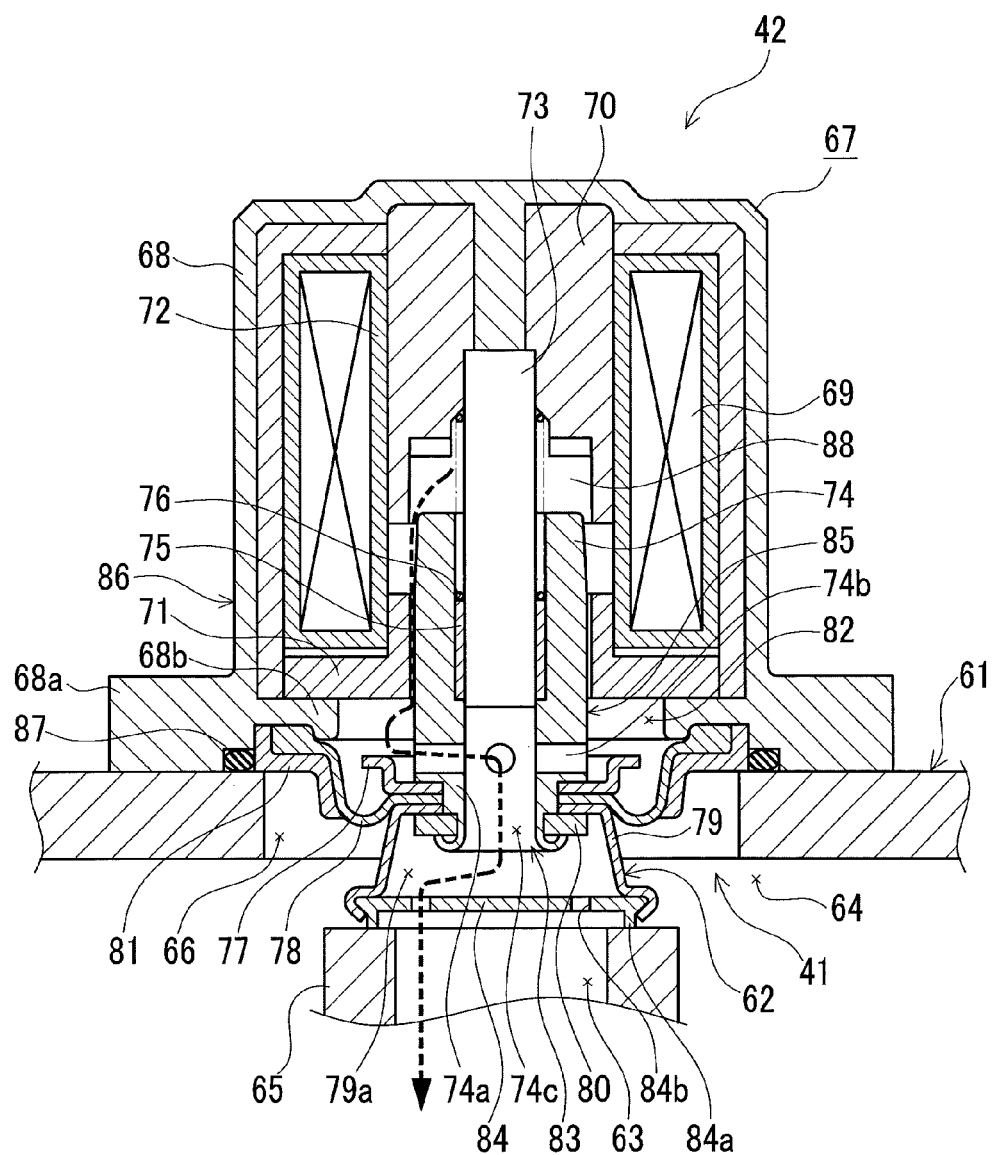
FIG. 14 is a cross sectional view showing a configuration of ABV in the eighth embodiment.

FIG. 13 is a schematic configuration view of a supercharger-equipped gasoline engine system including a low-pressure-loop EGR apparatus of the eighth embodiment. This gasoline engine system differs from the gasoline engine system of FIG. 1 in that a residual gas removal passage 43 is not provided in the ABV 42. FIG. 14 is a cross sectional view showing a configuration of the ABV 42 of the present embodiment. This ABV 42 differs from the ABV 42 of FIG. 2 in that the communication passage 89, the pipe joint 90, and the check valve 44 are not provided.

The present embodiment is characterized by the control details of the ABV 42. Specifically, when the ABV 42 is operated from the closed state to the open state, the movable unit 85 is moved upward, causing the air in the escape chamber 88 to move to the pressure balance chamber 82 via the gap between the outer periphery of the movable unit 85 and the end plate 71. Accordingly, the EGR gas remaining in the pressure balance chamber 82 is discharged to the intake bypass passage 41 through the air holes 84b of the shielding plate 84.

Thereafter, when the ABV 42 is shifted from the open state to the closed state, the movable unit 85 is moved downward, causing fresh air in the intake bypass passage 41 to flow in the pressure balance chamber 82. Furthermore, the air flowing in the pressure balance chamber 82 moves to the escape chamber 88 via the gap between the outer periphery of the moveable element 85 and the end plate 71. This causes fresh air to flow in the escape chamber 88 and the pressure balance chamber 82. The concentration of EGR gas remaining in the escape chamber 88 and the pressure balance chamber 82 is thus decreased.

By repetition of the above opening and closing operations of the ABV 42, the concentration of EGR gas remaining in the pressure balance chamber 82 can be reduced. Even when the EGR gas is not completely eliminated, no problem occurs because the EGR gas does not produce condensed water even if the engine 1 is stopped and the ABV 42 is cooled, as long as the concentration of EGR gas is reduced to a predetermined value or less.

Repeating opening and closing operations of the ABV 42 can reduce the concentration of EGR gas remaining in the pressure balance chamber 82 of the ABV 42. However, if the ABV 42 is subjected to the opening and closing operations by the same number of times in any case, the life of the ABV 42 may be shortened. In the present embodiment, therefore, the concentration of the EGR gas remaining in the pressure balance chamber 82 of the ABV 42 is estimated. If the concentration is estimated to be high, the number of times for repeating the opening and closing operations of the ABV 42 is set as large as possible. If the concentration is estimated to be low, the number of times for repeating opening and closing operations of the ABV 42 is set small.

Figure 15:
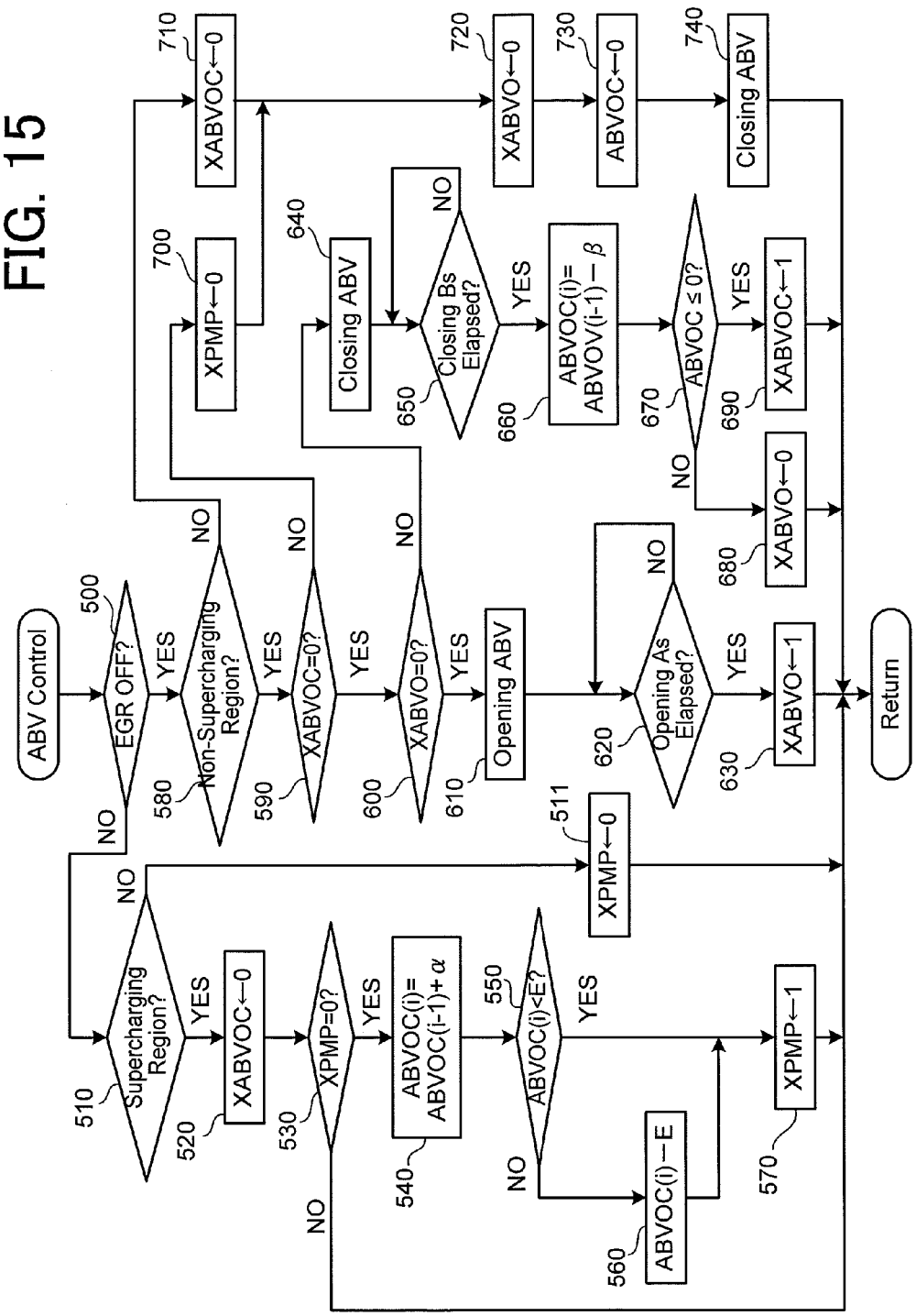
FIG. 15 is a flowchart showing one example of control details of ABV in the eighth embodiment.

FIG. 15 is a flowchart showing one example of control details of the ABV 42. The ECU 50 determines in Step 500 whether or not the EGR is off (EGR is cut). If NO in Step 500, the ECU 50 returns the processing to Step 510. If YES in Step 500, the ECU 50 shifts the processing to Step 580.

In Step 580, the ECU 50 determines whether or not the operating condition of the engine 1 is in a non-supercharging region. If NO in Step 580, the ECU 50 shifts the processing to Step 710. If YES in Step 580, the ECU 50 shifts the processing to Step 590.

In Step 710, the ECU 50 resets a scavenging completion determination flag XAVBOC to "0". This flag XABVOC is set to "1" when the scavenging of the pressure balance chamber 82 is completed by removal of residual EGR gas from the pressure balance chamber 82 of the ABV 42, while it is reset to "0" when the scavenging is not completed.

In Step 720, the ECU 50 resets the ABV opening control flag XABVO to "0". This flag XABVO is set to "1" when the ABV 42 is opened, while it is reset to "0" when the ABV 42 is closed.

In Step 730, the ECU 50 resets the number ABVOC of scavenging operations which will be mentioned later to "0". In Step 740, the ECU 50 controls the ABV 42 to close and returns the processing to Step 500.

In Step 590, on the other hand, the ECU 50 determines whether or not the scavenging completion determination flag XABVOC is "0". If NO in Step 590, the ECU 50 shifts the processing to Step 700. If YES in Step 590, the ECU 50 shifts the processing to Step 600.

In Step 700, the ECU 50 resets a supercharging determination flag XPMP to "0" and then shifts the processing to Step 720. This flag XPMP is set to "1" when supercharging is being performed, while it is reset to "0" when supercharging is not being performed.

In Step 600, the ECU 50 determines whether or not the ABV opening control flag XABVO is "0". If NO in Step 600, the ECU 50 shifts the processing to Step 640. If YES in Step 600, the ECU 50 shifts the processing to Step 610.

In Step 610, the ECU 50 controls the ABV 42 to open. In Step 620, successively, the ECU 50 waits for a lapse of a predetermined time As after valve opening, and then shifts the processing to Step 630. In Step 630, the ECU 50 sets the ABV opening control flag XABVO to "1" and returns the processing to Step 500.

On the other hand, in Step 640, the ECU 50 controls the ABV 42 to close. In Step 650, the ECU 50 waits for a lapse of a predetermined time Bs after valve closing and shifts the processing to Step 660. In Step 660, the ECU 50 calculates the current number ABVOC(i) of ABV scavenging operations by subtracting a predetermined value β from the previous number ABVOC(i−1) of ABV scavenging operations.

In Step 670, the ECU 50 determines whether or not the number ABVOC of ABV scavenging operations is equal to or less than 0. If YES in Step 670, the ECU 50 shifts the processing to Step 690. If NO in Step 670, the ECU 50 shifts the processing to Step 680.

In Step 690, it is indicated that scavenging is completed, the ECU 50 sets the scavenging completion determination flag XABVOC to "1" and returns the processing to Step 500.

In Step 680, it is indicated that the ABV 42 is being closed, the ECU 50 resets the ABV opening control flag XABVO to "0" and returns the processing to Step 500.

On the other hand, in Step 510, the ECU 50 determines whether or not the operating condition of the engine 1 is in a supercharging region, that is, whether or not supercharging is being performed. If NO in Step 510, the ECU 50 shifts the processing to Step 511. If YES in Step 510, the ECU 50 shifts the processing to Step 520.

In Step 511, it is indicated that the operating condition of the engine 1 is not in the supercharging region, the ECU 50 resets the supercharging determination flag XPMP to "0" and then returns the processing to Step 500.

In Step 520, the ECU 50 resets the scavenging completion determination flag XABVOC to "0".

In Step 530, the ECU 50 determines whether or not the supercharging determination flag XPMP is "0". If NO in Step 530, the ECU 50 returns the processing to Step 500. If YES in Step 530, the ECU 50 shifts the processing to Step 540.

In Step 540, the ECU 50 calculates the current number ABVOC(i) of ABV scavenging operations by adding a predetermined value α to the previous number ABVOC(i−1) of ABV scavenging operations.

In Step 550, the ECU 50 successively determines whether or not the number ABVOC(i) of ABV scavenging operations is smaller than a predetermined value E. If NO in Step 550, the ECU 50 shifts the processing to Step 560. If YES in Step 550, the ECU 50 shifts the processing to Step 570.

In Step 560, the ECU 50 subtracts the predetermined value E from the number ABVOC(i) of ABV scavenging operations and then shifts the processing to Step 570.

In Step 570 subsequent to Step 550 or 560, it is indicated that the operating condition of the engine 1 is in the supercharging region, the ECU 50 sets the supercharging determination flag XPMP to "1" and returns the processing to Step 500.

According to the above control, as the number of process conditions whereby the non-supercharging region is changed to the supercharging condition, the number of opening and closing the ABV 42 to scavenge the pressure balance chamber 82 is increased. Thus, when the concentration of EGR gas remaining in the pressure balance chamber 82 is estimated to be high, the number ABVOC of ABV scavenging operations is increased, so that the concentration of EGR gas remaining in the pressure balance chamber 82 can be reduced efficiently. In addition, the ABV 42 is not subjected to unnecessary opening and closing operations and thus the durability of the ABV 42 can be improved.

In the present embodiment, when the ABV 42 is to be shifted from the closed state to the open state to move the movable unit 85 upward, the movable unit 85 has to be moved as slowly as possible. If the moving speed of the movable unit 85 is high, the air in the escape chamber 88 is only compressed but does not flow in the pressure balance chamber 82 through the gap around the outer periphery of the movable unit 85.

It is therefore necessary to set electric power to be applied to the coil 69 to an amount of electrical power close to a minimum amount at which the movable unit 85 is movable in order to reduce the suction power of the coil 69. For this purpose, the amount of electrical power may be controlled by voltage control or electric current control.

Ninth Embodiment

A ninth embodiment of a low-pressure-loop EGR apparatus of an engine according to the invention will be explained below in detail, referring to accompanying drawings.

Figure 16:
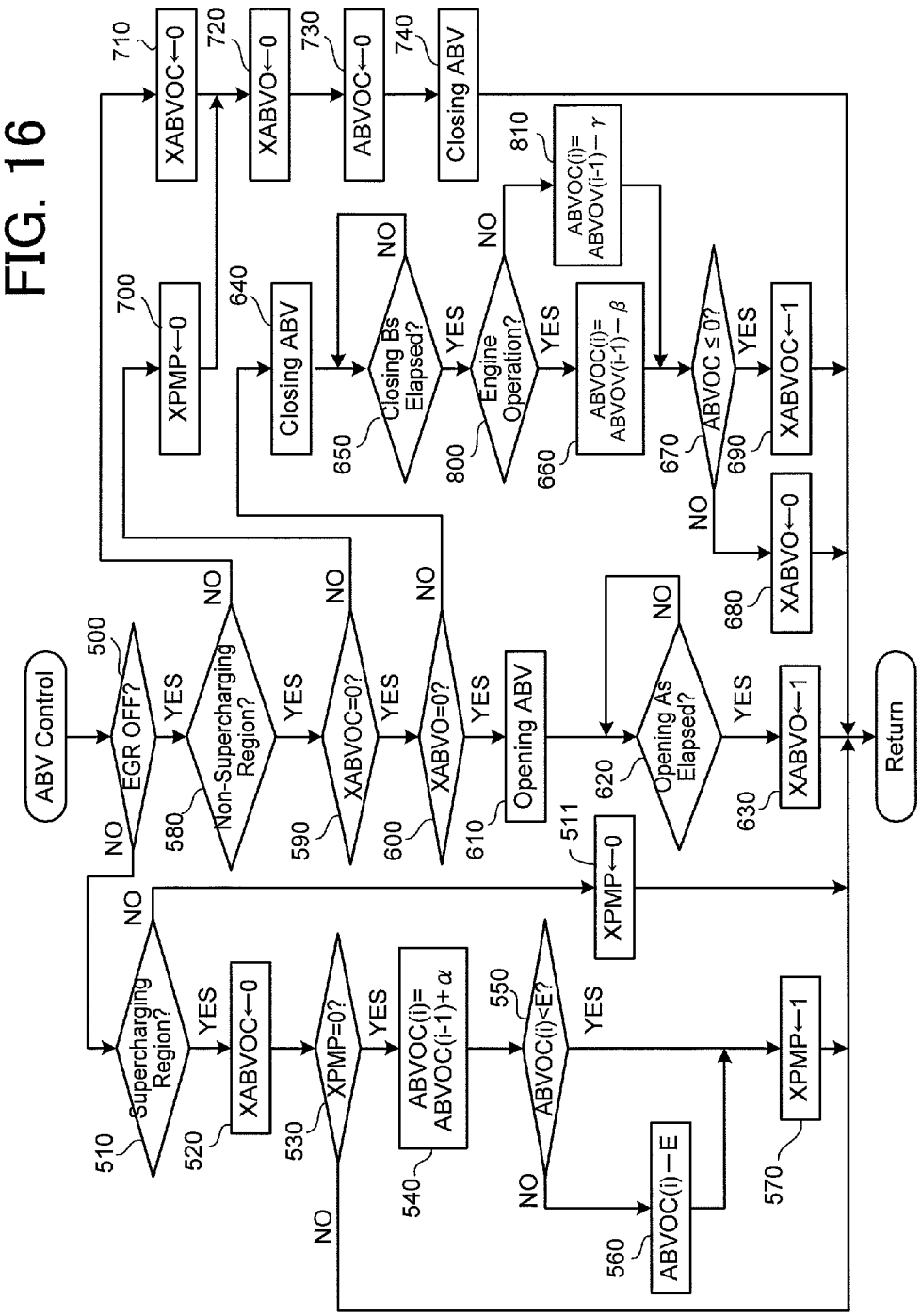
FIG. 16 is a flowchart showing one example of control details of ABV in a ninth embodiment.

The ninth embodiment differs from the eighth embodiment in the control details of the ABV 42. FIG. 16 is a flowchart showing one example of the control details of the ABV 42 of the ninth embodiment. This flowchart differs from the flowchart of FIG. 15 in that Steps 800 and 810 are additionally provided between Steps 650, 660, and 670.

Specifically, in the flowchart of FIG. 16, in Step 800 subsequent to Step 650, it is determined whether or not the engine 1 is being operated. If YES in Step 800, the ECU 50 shifts the processing to Step 660. If NO in Step 800, the ECU 50 shifts the processing to Step 810.

In Step 810, the ECU 50 calculates the current number ABVOC(i) of ABV scavenging operations by subtracting a predetermined value γ from the previous number ABVOC (i−1) of ABV scavenging operations. The ECU 50 then shifts the processing to Step 670. Herein, when the ABV 42 is opened and closed while EGR cut and engine stop are being simultaneously performed, the concentration of EGR gas remaining in the pressure balance chamber 82 of the ABV 42 decreases. Thus, the predetermined value γ is a value to reduce the number ABVOC of ABV scavenging operations by the required number of times. The above predetermined values β and γ are in a relationship expressed by "β>γ". This is because fresh air does not flow to the in-flow passage 63 side in the ABV 42 during stop of the engine 1, so that the amount of EGR gas removable from the pressure balance chamber 82 of the ABV 42 is small as compared with the opening and closing operations of the ABV 42 performed while the EGR cut and the engine operation are simultaneously performed. Therefore, during engine stop, the number ABVOC of ABV scavenging operations has to be increased.

Tenth Embodiment

A tenth embodiment of a low-pressure-loop EGR apparatus of an engine according to the invention will be explained below in detail, referring to accompanying drawings.

Each of the above embodiments shows the low-pressure-loop EGR apparatus to be mounted in the engine 1 equipped with the supercharger 7, in which the pressure balance chamber 82 of the ABV 42 provided in the intake bypass passage 41 is assumed as the specific part, the residual gas removal unit is provided to remove EGR gas remaining in the relevant pressure balance chamber 82. On the other hand, the tenth embodiment shows a low-pressure-loop EGR apparatus to be provided in a gasoline engine system equipped with the supercharger, in which the blowby gas returning apparatus shown in FIGS. 20 and 21 explained as the conventional art are provided. In the present embodiment, the residual gas removal unit to remove EGR gas remaining in the ejector 37 is explained on the assumption that the inside of the ejector 37 provided in the intake bypass passage 41 is the specific part.

Figure 17:
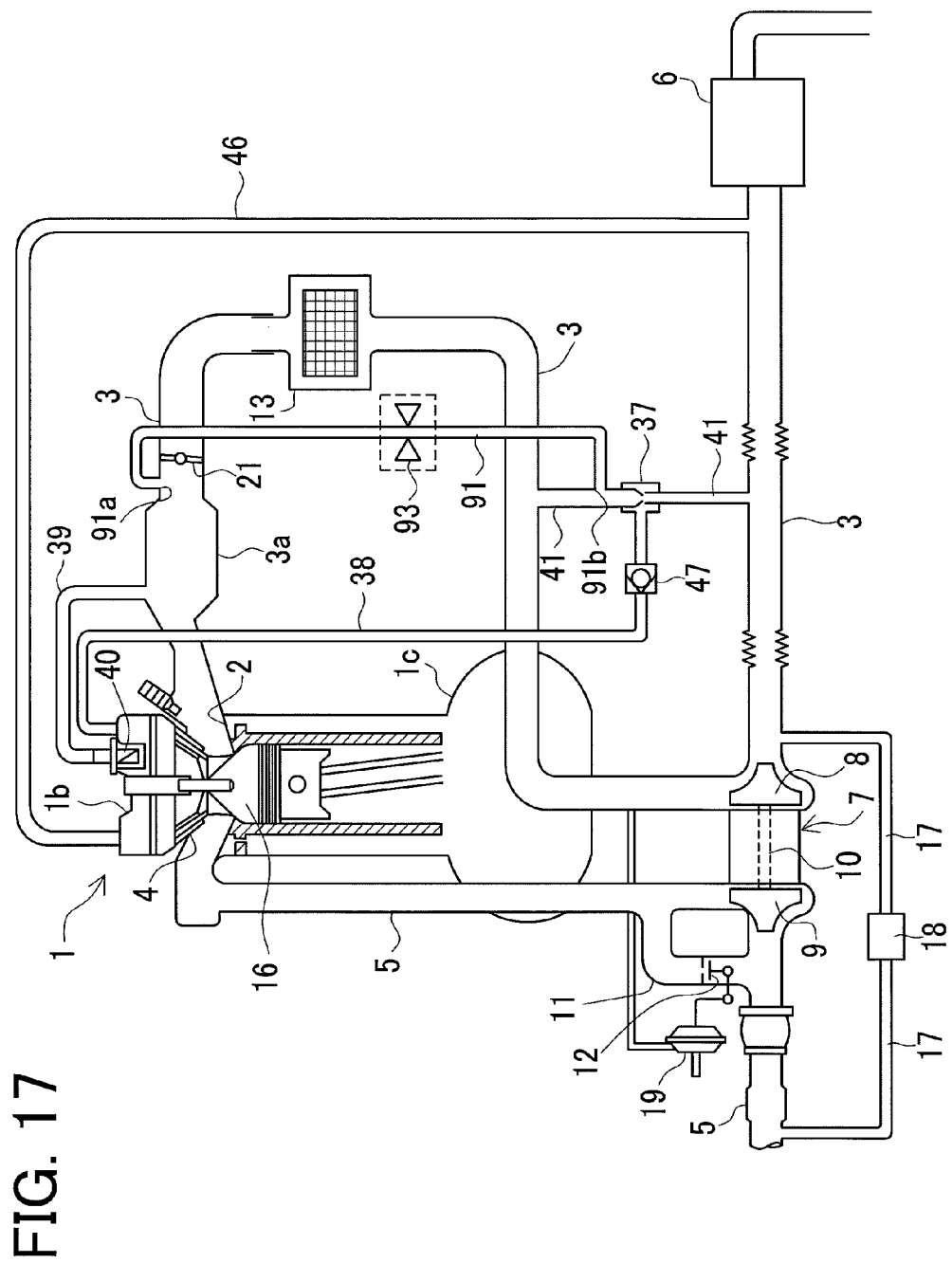
FIG. 17 is a schematic configuration view showing a supercharger-equipped gasoline engine system including a low-pressure-loop EGR apparatus and a blowby gas returning apparatus in a tenth embodiment.
Figure 20:
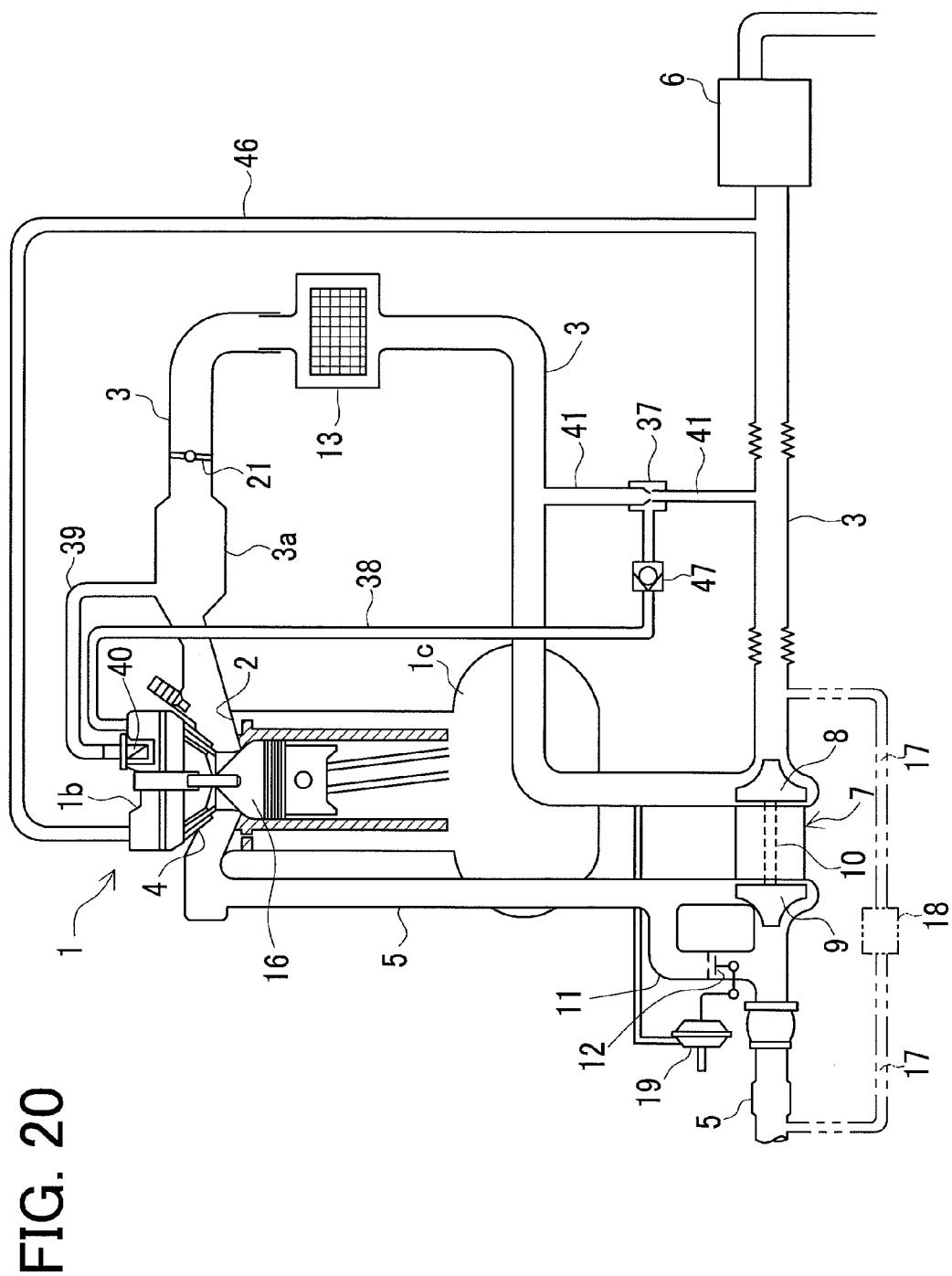
FIG. 20 is a schematic configuration view showing a supercharger-equipped gasoline engine system including a blowby gas returning apparatus in a conventional art.
Figure 21:
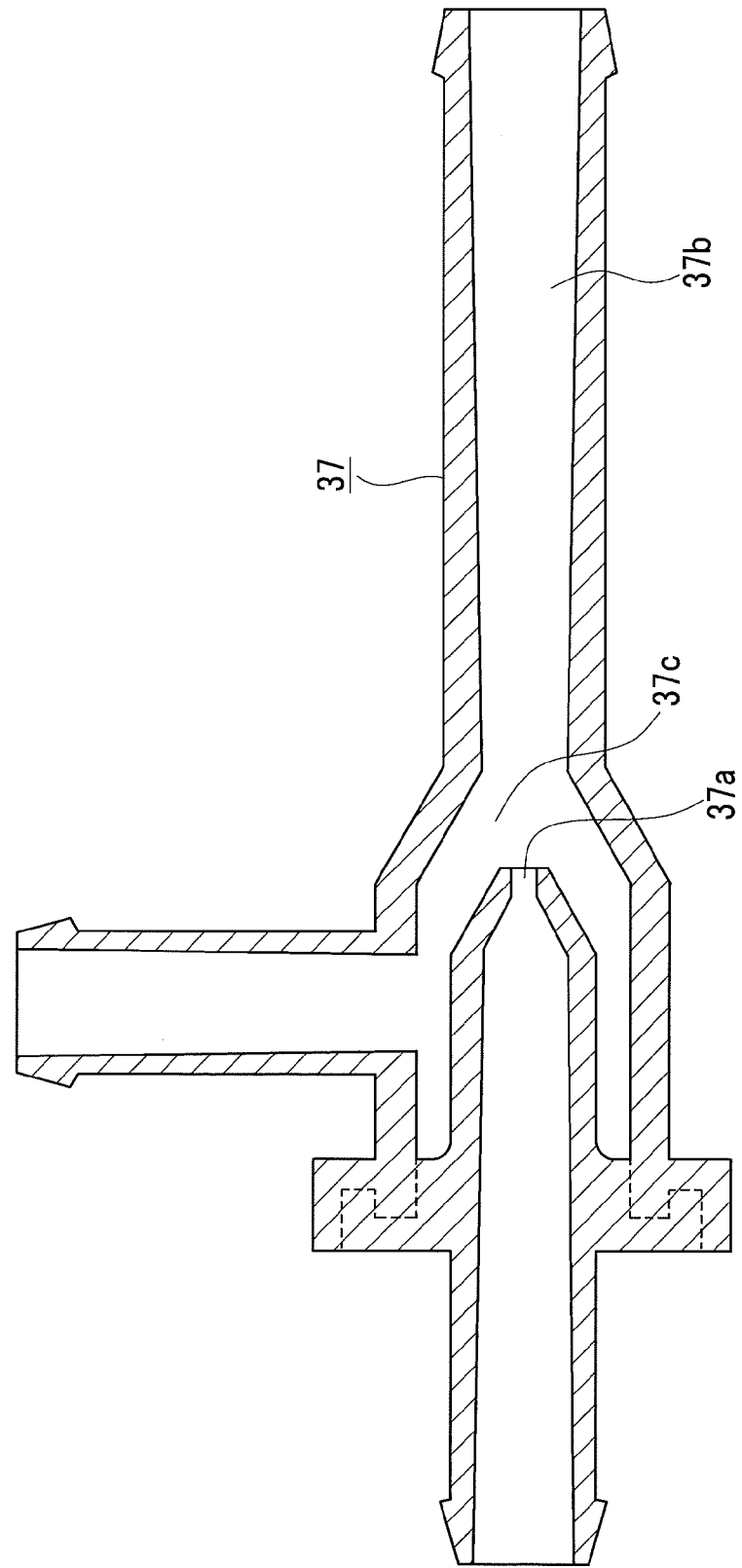
FIG. 21 is a cross sectional view showing a schematic configuration of an ejector in the conventional art.

FIG. 17 is a schematic configuration view of a supercharger-equipped gasoline engine system including a low-pressure-loop EGR apparatus and a blowby gas returning apparatus in the present embodiment. In this embodiment, similar or identical parts to those in FIG. 20 are given the same reference signs and their explanations are omitted. The following explanation will be made with a focus on differences from those in FIG. 20. In the engine system shown in FIG. 17, the residual gas removal unit includes a residual gas removal passage 91 to allow EGR gas remaining in the ejector 37 to flow out. A first end 91a of the residual gas removal passage 91 is connected to the intake passage 3 downstream of the throttle valve 21 and a second end 91b of the residual gas removal passage 91 is connected to the intake bypass passage 41 near the ejector 37. In the residual gas removal passage 91, a restrictor 93 is provided to restrict a flow rate of gas allowed to flow in the passage 91 to a small rate. To remove EGR gas remaining in the ejector 37, the negative pressure generated in the intake passage 3 downstream of the throttle valve 21 is caused to act on the intake bypass passage 41 via the residual gas removal passage 91.

In the present embodiment, accordingly, during operating of the engine 1 and during supercharging, EGR gas is allowed to flow together with intake air into the intake bypass passage 41 and the ejector 37. Thereafter, EGR gas may remain in the ejector 37. Herein, according to the present embodiment, during light load operation of the engine 1 for which the supercharger 7 is not operated, the negative pressure is generated in the intake passage 3 downstream of the throttle valve 21. This negative pressure acts on the intake bypass passage 41 via the residual gas removal passage 91, thereby causing the EGR gas remaining in the ejector 37 to be sucked into the intake passage 3 through the residual gas removal passage 91 and then removed. At the same time, fresh air flows in the ejector 37, thereby scavenging the inside of the ejector 37 to remove EGR gas remaining in the inside of the ejector 37, assumed as the specific part, provided in the intake bypass passage 41. It is further possible to prevent condensed water from becoming generated due to residual EGR gas in the ejector 37 in which the EGR gas flows.

In the present embodiment, only a small amount of EGR gas remains in the ejector 37 and the throttle valve 83 is provided in the residual gas removal passage 91, so that the flow rate of gas flowing in the residual gas removal passage 91 is restricted to a small rate. This can prevent the intake air (fresh air) containing EGR gas from being excessively discharged from the inside of the ejector 37 to the intake passage 3 which is a discharge address. Operating variations of the engine 1 can therefore be suppressed.

Eleventh Embodiment

An eleventh embodiment of a low-pressure-loop EGR apparatus of an engine according to the invention will be explained below in detail, referring to accompanying drawings.

Figure 18:
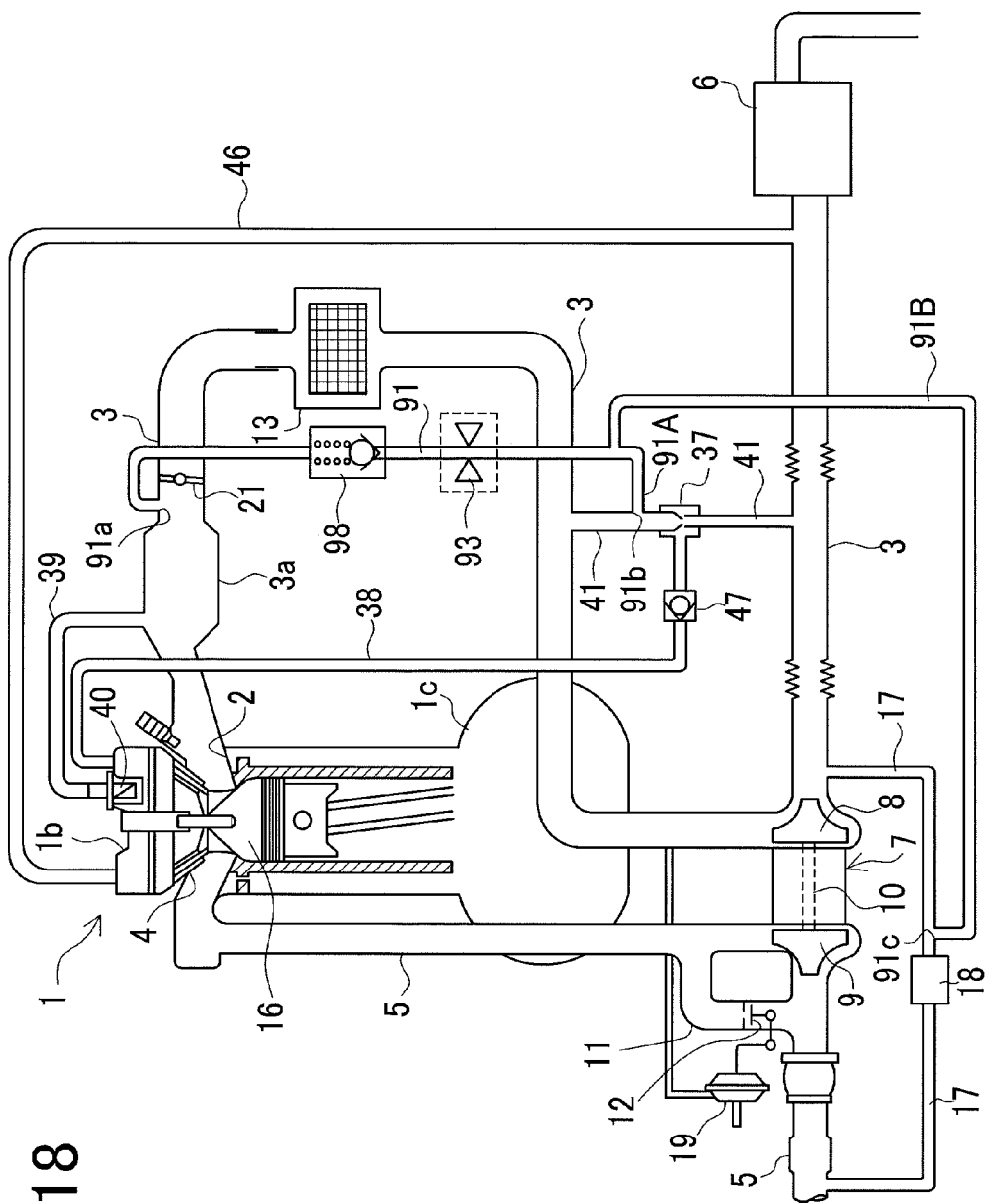
FIG. 18 is a schematic configuration view showing a supercharger-equipped gasoline engine system including a low-pressure-loop EGR apparatus and a blowby gas returning apparatus in an eleventh embodiment.

FIG. 18 is a schematic configuration view of a supercharger-equipped gasoline engine system including a low-pressure-loop EGR apparatus and a blowby gas returning apparatus in the present embodiment. In the low-pressure-loop EGR apparatus, after stop of the engine 1, EGR gas may remain even in the EGR passage 17 downstream of the EGR valve 18 in the closed state. In the present embodiment, therefore, in addition to the configuration of the tenth embodiment, there is further provided a residual gas removal unit to remove EGR gas remaining in a part of the EGR passage 17 downstream of the EGR valve 18, the part being assumed as the specific part. In the present embodiment, the residual gas removal passage 91 upstream of the restrictor 93 bifurcates into a first branch passage 91A whose second end 91b is communicated with the intake bypass passage 41 and a second branch passage 91B whose second end 91c is communicated with the EGR passage 17 downstream of the EGR valve 18. In the present embodiment, a check valve 98 is provided in the residual gas removal passage 91 downstream of the restrictor 93. This check valve 98 is operative to permit a flow of gas toward the intake passage 3 and block an opposite flow. In these respects, the present embodiment differs in configuration from the tenth embodiment.

The eleventh embodiment, therefore, can provide the following operations and effects in addition to the operations and effects of the tenth embodiment. Specifically, the negative pressure generated in the intake passage 3 acts on the EGR passage 17 downstream of the EGR valve 18 through the residual gas removal passage 91 and the second branch passage 91B, thereby causing the EGR gas remaining in the EGR passage 17 to be sucked and removed into the intake passage 3 through the second branch passage 91B and the residual gas removal passage 91. Simultaneously, fresh air is allowed to flow in the relevant part of the EGR passage 17, thereby scavenging the relevant part of the EGR passage 17. Thus, the EGR gas remaining in the specific part, that is, the downstream part of the EGR passage 17 from the EGR valve 18, can be removed therefrom. It is further possible to prevent the generation of condensed water due to residual EGR gas in the EGR passage 17 (the downstream part of the passage 17 from the EGR valve 18) in which EGR gas flows.

In the present embodiment, since the check valve 98 is provided in the residual gas removal passage 91, a back-flow of gas from the intake passage 3 toward the residual gas removal passage 91 is blocked during supercharging for which the supercharger 7 is operated. This can protect the EGR passage 17 corresponding to the specific part during e.g. supercharging of the engine 1 and thereby ensure appropriate function of the EGR passage 17.

Twelfth Embodiment

A twelfth embodiment of a low-pressure-loop EGR apparatus of an engine according to the invention will be explained below in detail, referring to accompanying drawings.

Figure 19:
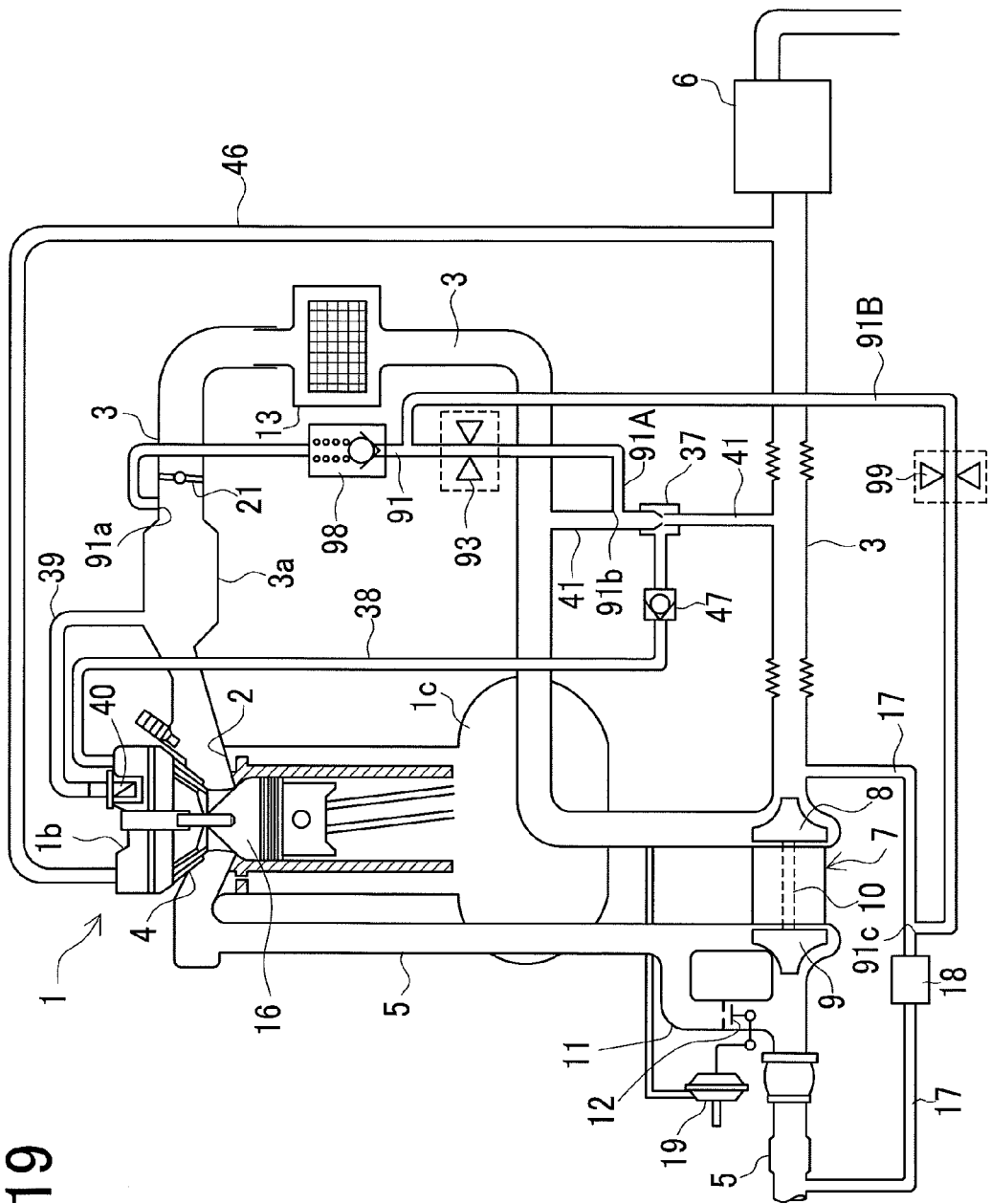
FIG. 19 is a schematic configuration view showing a supercharger-equipped gasoline engine system including a low-pressure-loop EGR apparatus and a blowby gas returning apparatus in a twelfth embodiment.

FIG. 19 is a schematic configuration view of a supercharger-equipped gasoline engine system including a low-pressure-loop EGR apparatus and a blowby gas returning apparatus in the twelfth embodiment. In this embodiment, the residual gas removal passage 91 bifurcates from a point between the check valve 98 and the restrictor 93 into two branch passages; a first branch passage 91A whose second end 91b is communicated with the intake bypass passage 41 and a second branch passage 91B whose second end 91c is communicated with the EGR passage 17 downstream of the EGR valve 18. A restrictor 99 is provided in the second branch passage 91B. In these respects, the present embodiment differs in configuration from the eleventh embodiment.

As above, the present embodiment can provide the following operations and effects in addition to the operations and effects in the eleventh embodiment. In the twelfth embodiment, specifically, only a slight amount of EGR gas remains in the EGR passage 17 downstream of the EGR valve 18 and the restrictor 99 is provided in the second branch passage 91B of the residual gas removal passage 91, so that an amount of the gas allowed to flow in the branch passage 91B is restricted to a small value by the restrictor 99. This can prevent intake air (fresh air) containing residual EGR gas from being excessively discharged from the specific part, that is, the EGR passage 17, to the intake passage 3. Operating variations of the engine 1 can thus be suppressed.

The present invention is not limited to each of the aforementioned embodiments and may be embodied in other specific forms without departing from the essential characteristics thereof.

Each of the above embodiments is configured to remove EGR gas remaining in the specific part defined by the pressure balance chamber 82 of the ABV 42, the inside of the ejector 37, or the EGR passage 17. The specific part is not limited thereto and may be defined by any part that EGR gas flows in or through. For instance, the inside of the intercooler 13 provided in the intake passage 3 can be assumed as the specific part.

In the fourth embodiment, the VSV 94 is provided as an opening and closing valve in the residual gas removal passage 91 and controlled to open and close. As an alternative, in each of the tenth to twelfth embodiments, a VSV may be provided in the residual gas removal passage 91 and controlled to open and close.

In each of the eleventh and twelfth embodiments, the supercharger-equipped gasoline engine system including the blowby gas returning apparatus is configured to remove EGR gas remaining in the specific parts, that is, the inside of the ejector 37 and the EGR passage 17 downstream of the EGR valve 18. As an alternative, it may be arranged to remove EGR gas remaining in only an EGR passage downstream of an EGR valve as a specific part.

INDUSTRIAL APPLICABILITY

The present invention is utilizable as an exhaust gas recirculation apparatus of for example a supercharger-equipped gasoline engine and a diesel engine.

| Reference Signs List | | | |
|---|---|---|---|
| 1 | Engine | 3 | Intake passage |
| 3a | Surge tank | 5 | Exhaust passage |
| 7 | Supercharger | 8 | Compressor |
| 9 | Turbine | 10 | Rotary shaft |
| 14 | Electronic throttle device | 16 | Combustion chamber |
| 17 | EGR passage | 17a | Outlet |
| 17b | Inlet | 18 | EGR valve |
| 21 | Throttle valve | 37 | Ejector |
| 38 | First blowby gas returning passage | | |
| 41 | Intake bypass passage | 41a | Outlet |
| 42 | ABV | 43 | Residual gas removal passage |
| 44 | Check valve | 50 | ECU |
| 62 | Valve member | 65 | Valve seat |
| 67 | Electromagnetic device | 82 | Pressure balance chamber |
| 83 | Pressure introduction passage | 85 | Movable element |
| 89 | Communication passage | 90 | Pipe joint |
| 91 | Residual gas removal passage | 91A | Branch passage |
| 91B | Branch passage | 91a | First end |
| 91b | Second end | 91c | Second end |
| 92 | Check valve | 93 | Throttle valve |
| 94 | VSV | 95 | Residual gas removal passage |
| 95a | First end | 95b | Second end |
| 96 | Pressurizing pump | 97 | Negative pressure pump |
| 98 | Check valve | 99 | Throttle valve |

The invention claimed is:

1. A low-pressure-loop exhaust gas recirculation apparatus of an engine, the apparatus comprising:

a supercharger provided between an intake passage and an exhaust passage of the engine and configured to increase pressure of intake air in the intake passage, the supercharger including:
   a compressor placed in the intake passage;
   a turbine placed in the exhaust passage; and
   a rotary shaft connecting the compressor and the turbine so that they are integrally rotatable;

an exhaust gas recirculation passage configured to allow part of exhaust gas discharged from a combustion chamber of the engine to the exhaust passage to flow as exhaust recirculation gas to the intake passage to return to the combustion chamber, the exhaust gas recirculation passage including:
   an inlet connected to the exhaust passage downstream of the turbine; and
   an outlet connected to the intake passage upstream of the compressor;

an exhaust recirculation valve to regulate a flow of the exhaust recirculation gas in the exhaust recirculation passage;

an intake bypass passage configured to bypass between an upstream part of the intake passage from the compressor and a downstream part of the intake passage from the compressor;

an intake bypass valve provided in the intake bypass passage to open and close the intake bypass passage, the intake bypass valve including:
   a valve seat provided above the intake bypass passage;
   a movable part having a valve member provided to be seatable on the valve seat;
   a driver configured to drive the movable part;
   a pressure balance chamber and an escape chamber which are provided and partitioned between the driver and the movable part; and
   a pressure introduction passage formed in the movable part to allow communication between the intake bypass passage and the pressure balance chamber; and an electronic controller to control the intake bypass valve, wherein when the exhaust recirculation valve is closed and in a non-supercharging region having been changed from a supercharging region, the electronic controller repeats opening and closing of the intake bypass valve to admit air into the pressure balance chamber and discharge the exhaust recirculation gas remaining in the pressure balance chamber to the intake bypass passage through the pressure introduction passage to reduce concentration of the exhaust recirculation gas remaining in the pressure balance chamber.

2. The low-pressure-loop exhaust gas recirculation apparatus of an engine according to claim 1, wherein the electronic controller is configured to estimate the concentration of the exhaust recirculation gas remaining in the pressure balance chamber and set the number of times for repeating opening and closing of the intake bypass valve according to the estimated concentration.

* * * * *